United States Patent
Yamaguchi et al.

(10) Patent No.: US 9,608,501 B2
(45) Date of Patent: Mar. 28, 2017

(54) ROTARY ELECTRIC MACHINE

(71) Applicant: MITSUBISHI ELECTRIC CORPORATION, Tokyo (JP)

(72) Inventors: Shinichi Yamaguchi, Tokyo (JP); Koki Naka, Tokyo (JP); Kazuaki Ando, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/650,958

(22) PCT Filed: Dec. 13, 2012

(86) PCT No.: PCT/JP2012/082406
§ 371 (c)(1),
(2) Date: Jun. 10, 2015

(87) PCT Pub. No.: WO2014/091609
PCT Pub. Date: Jun. 19, 2014

(65) Prior Publication Data
US 2015/0326084 A1     Nov. 12, 2015

(51) Int. Cl.
*H02K 3/28* (2006.01)
*H02K 21/14* (2006.01)
*H02K 3/12* (2006.01)

(52) U.S. Cl.
CPC .............. *H02K 21/14* (2013.01); *H02K 3/12* (2013.01); *H02K 3/28* (2013.01); *H02K 2201/06* (2013.01); *H02K 2213/03* (2013.01)

(58) Field of Classification Search
CPC ........................................................ H02K 3/28
(Continued)

(56) References Cited

U.S. PATENT DOCUMENTS

| | | | |
|---|---|---|---|
| 6,940,201 B2 * | 9/2005 | Umeda | H02K 3/28 310/179 |
| 7,605,514 B2 | 10/2009 | Ito et al. | |

(Continued)

FOREIGN PATENT DOCUMENTS

| | | |
|---|---|---|
| CN | 102594066 A | 7/2012 |
| DE | 2741403 A1 | 3/1979 |

(Continued)

OTHER PUBLICATIONS

JPO Office Action for Application No. 2013-535199 dated Sep. 24, 2013.
(Continued)

*Primary Examiner* — Burton Mullins
(74) *Attorney, Agent, or Firm* — Sughrue Mion, PLLC; Richard C. Turner

(57) ABSTRACT

A rotary electric machine is a rotary electric machine including a stator of a distributed winding type including a plurality of first slots, in each of which winding wires of a plurality of same phases or a winding wire of one phase are arranged, and a plurality of second slots, in each of which winding wires of a plurality of different phases are arranged. The total number of turns in each of the first slots is same as one another. The total number of turns in each of the second slots is same as one another. The total number of turns in the first slot and the total number of turns in the second slot are different from each other.

2 Claims, 31 Drawing Sheets

(58) Field of Classification Search
USPC .................. 310/180, 184, 185, 188
See application file for complete search history.

(56) References Cited

U.S. PATENT DOCUMENTS

| | | |
|---|---|---|
| 8,536,754 B2 | 9/2013 | Dajaku |
| 8,736,131 B2 * | 5/2014 | Kometani ............... H02K 3/28 310/198 |
| 8,836,195 B2 * | 9/2014 | Yokochi ................. H02K 3/28 310/179 |
| 2009/0015080 A1 | 1/2009 | Vollmer et al. |
| 2012/0001512 A1 | 1/2012 | Dajaku |
| 2012/0228981 A1 | 9/2012 | Dajaku |

FOREIGN PATENT DOCUMENTS

| | | |
|---|---|---|
| DE | 102008051047 A1 | 4/2010 |
| DE | 102009036034 A1 | 2/2011 |
| JP | 50-47102 A | 4/1975 |
| JP | 50-139304 A | 11/1975 |
| JP | 53-25804 A | 3/1978 |
| JP | 54-86714 A | 7/1979 |
| JP | 56-166737 * | 12/1981 ............... H02K 3/28 |
| JP | 61-52450 U | 4/1986 |
| JP | 6-261479 A | 9/1994 |
| JP | 7-143697 A | 6/1995 |
| JP | 8-205444 A | 8/1996 |
| JP | 9-121491 A | 5/1997 |
| JP | 2765764 B2 | 6/1998 |
| JP | 2004-159492 A | 6/2004 |
| JP | 2004-248448 A | 9/2004 |
| JP | 2007-259541 A | 10/2007 |
| JP | 2008-514167 A | 5/2008 |
| JP | 4745857 B2 | 8/2011 |
| JP | 2011-223676 A | 11/2011 |

OTHER PUBLICATIONS

Taiwan Office Action for Application No. 102116325 dated Sep. 25, 2014.
International Search Report for PCT/JP2012/082406 dated Mar. 26, 2013 [PCT/ISA/210].
Communication dated May 2, 2016 from the German Patent and Trademark Office in counterpart application No. 112012007152.2.

* cited by examiner

FIG.3

| POSITION | PHASE | | NUMBER OF TURNS | |
|---|---|---|---|---|
| | UPPER | LOWER | UPPER | LOWER |
| No.1 | -V | U | n | n |
| No.2 | U | U | $\frac{\sqrt{3}}{2}n$ | $\frac{\sqrt{3}}{2}n$ |
| No.3 | U | -W | n | n |
| No.4 | -W | -W | $\frac{\sqrt{3}}{2}n$ | $\frac{\sqrt{3}}{2}n$ |
| No.5 | W | V | n | n |
| No.6 | V | V | $\frac{\sqrt{3}}{2}n$ | $\frac{\sqrt{3}}{2}n$ |
| No.7 | V | -U | n | n |
| No.8 | -U | -U | $\frac{\sqrt{3}}{2}n$ | $\frac{\sqrt{3}}{2}n$ |
| No.9 | U | W | n | n |
| No.10 | W | W | $\frac{\sqrt{3}}{2}n$ | $\frac{\sqrt{3}}{2}n$ |
| No.11 | W | V | n | n |
| No.12 | V | V | $\frac{\sqrt{3}}{2}n$ | $\frac{\sqrt{3}}{2}n$ |
| No.13(=No.1) | V | U | n | n |
| No.14(=No.2) | U | U | $\frac{\sqrt{3}}{2}n$ | $\frac{\sqrt{3}}{2}n$ |
| No.15(=No.3) | U | -W | n | n |
| ⋮ | ⋮ | ⋮ | ⋮ | ⋮ |

(n=INTEGER)

(a) FIFTH ORDER COMPONENT
(b) SEVENTH ORDER COMPONENT
(c) ELEVENTH ORDER COMPONENT
(d) THIRTEENTH ORDER COMPONENT
(e) SEVENTEENTH ORDER COMPONENT
(f) NINETEENTH ORDER COMPONENT

FIG.6

| ORDER | FRACTIONAL PITCH WINDING COEFFICIENT Kp | DISTRIBUTED WINDING COEFFICIENT Kd | WINDING COEFFICIENT Kp×Kd |
|---|---|---|---|
| FIRST ORDER (FUNDAMENTAL WAVE) | 1.000 | 0.928 | 0.928 |
| FIFTH ORDER | 1.000 | 0.000 | 0.000 |
| SEVENTH ORDER | 1.000 | 0.000 | 0.000 |
| ELEVENTH ORDER | 1.000 | 0.928 | 0.928 |
| THIRTEENTH ORDER | 1.000 | 0.928 | 0.928 |
| SEVENTEENTH ORDER | 1.000 | 0.000 | 0.000 |
| NINETEENTH ORDER | 1.000 | 0.000 | 0.000 |

FIG.11

| SLOT No. | PHASE | | NUMBER OF TURNS | |
|---|---|---|---|---|
| | UPPER | LOWER | UPPER | LOWER |
| No.1 | -V4 | U1 | $n$ | $n$ |
| No.2 | U2 | U3 | $\frac{\sqrt{3}}{2}n$ | $\frac{\sqrt{3}}{2}n$ |
| No.3 | -W1 | U4 | $n$ | $n$ |
| No.4 | -W2 | -W3 | $\frac{\sqrt{3}}{2}n$ | $\frac{\sqrt{3}}{2}n$ |
| No.5 | W4 | V1 | $n$ | $n$ |
| No.6 | V2 | V3 | $\frac{\sqrt{3}}{2}n$ | $\frac{\sqrt{3}}{2}n$ |
| No.7 | -U1 | V4 | $n$ | $n$ |
| No.8 | -U3 | -U2 | $\frac{\sqrt{3}}{2}n$ | $\frac{\sqrt{3}}{2}n$ |
| No.9 | -U4 | W1 | $n$ | $n$ |
| No.10 | W3 | W2 | $\frac{\sqrt{3}}{2}n$ | $\frac{\sqrt{3}}{2}n$ |
| No.11 | V1 | W4 | $n$ | $n$ |
| No.12 | V3 | V2 | $\frac{\sqrt{3}}{2}n$ | $\frac{\sqrt{3}}{2}n$ |
| No.13(=No.1) | V4 | U1 | $n$ | $n$ |
| No.14(=No.2) | U2 | U3 | $\frac{\sqrt{3}}{2}n$ | $\frac{\sqrt{3}}{2}n$ |
| No.15(=No.3) | -W1 | U4 | $n$ | $n$ |
| ⋮ | ⋮ | ⋮ | ⋮ | ⋮ |

FIG.15

| SLOT No. | PHASE | | NUMBER OF TURNS | |
|---|---|---|---|---|
| | UPPER | LOWER | UPPER | LOWER |
| No.1 | -V | U | n | n |
| No.2 | U | U | 0.9294n | 0.9294n |
| No.3 | U | U | 0.9294n | 0.9294n |
| No.4 | U | U | 0.9294n | 0.9294n |
| No.5 | U | -W | n | n |
| No.6 | -W | -W | 0.9294n | 0.9294n |
| No.7 | -W | -W | 0.9294n | 0.9294n |
| No.8 | -W | -W | 0.9294n | 0.9294n |
| No.9 | -W | V | n | n |
| No.10 | V | V | 0.9294n | 0.9294n |
| No.11 | V | V | 0.9294n | 0.9294n |
| No.12 | V | V | 0.9294n | 0.9294n |
| No.13 | V | -U | n | n |
| No.14 | -U | -U | 0.9294n | 0.9294n |
| No.15 | -U | -U | 0.9294n | 0.9294n |
| No.16 | -U | -U | 0.9294n | 0.9294n |
| No.17 | -U | W | n | n |
| No.18 | W | W | 0.9294n | 0.9294n |
| No.19 | W | W | 0.9294n | 0.9294n |
| No.20 | W | W | 0.9294n | 0.9294n |
| No.21 | W | -V | n | n |
| No.22 | -V | -V | 0.9294n | 0.9294n |
| No.23 | -V | -V | 0.9294n | 0.9294n |
| No.24 | -V | -V | 0.9294n | 0.9294n |
| No.25(=No.1) | -V | U | n | n |
| No.26(=No.2) | U | U | 0.9294n | 0.9294n |
| No.27(=No.3) | U | U | 0.9294n | 0.9294n |
| No.28(=No.4) | U | U | 0.9294n | 0.9294n |
| No.29(=No.5) | U | -W | n | n |
| ⋮ | ⋮ | ⋮ | ⋮ | ⋮ |

(n=INTEGER)

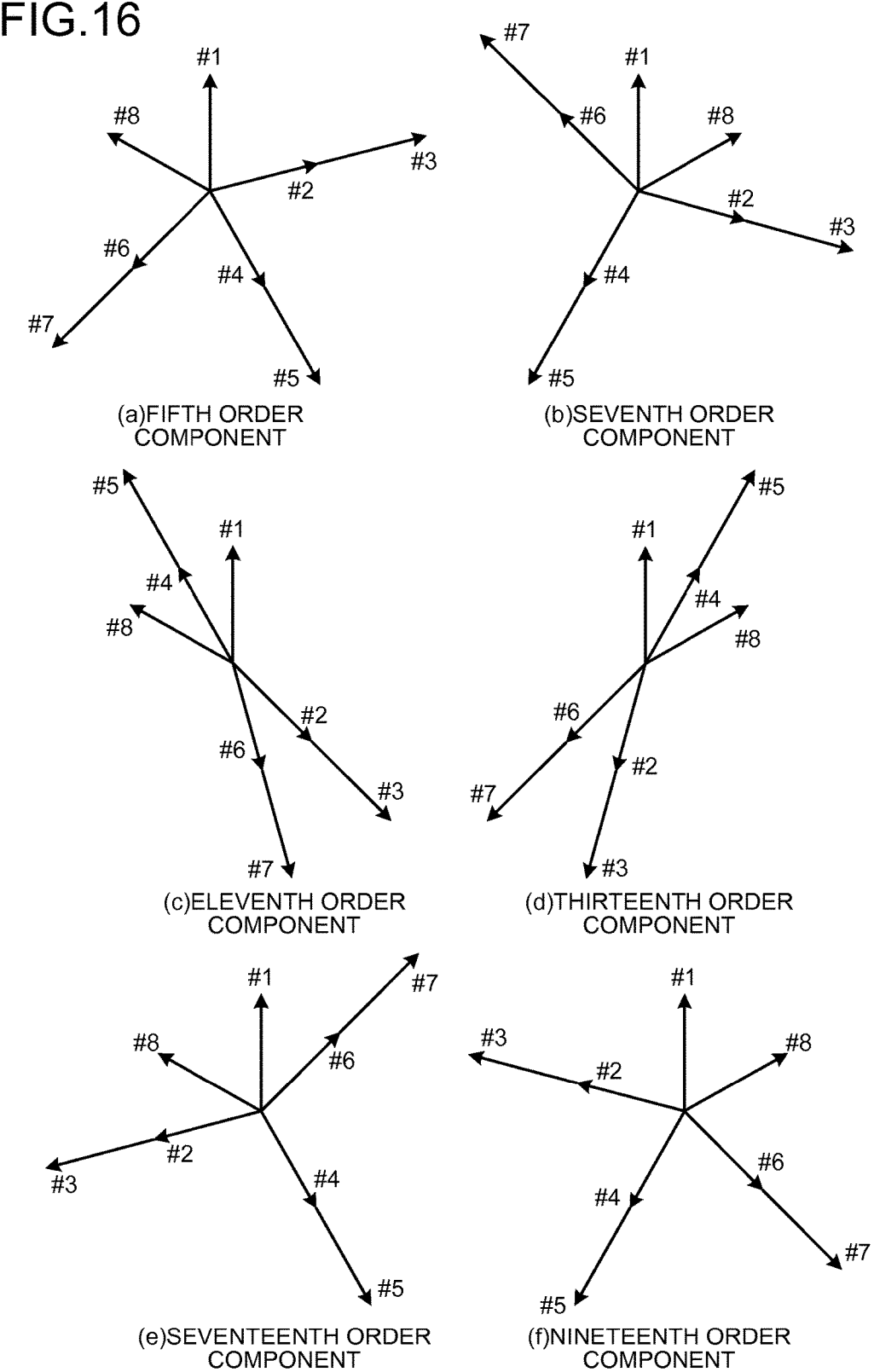

| ORDER | FRACTIONAL PITCH WINDING COEFFICIENT Kp | DISTRIBUTED WINDING COEFFICIENT Kd | WINDING COEFFICIENT Kp×Kd |
|---|---|---|---|
| FIRST ORDER (FUNDAMENTAL WAVE) | 1.000 | 0.948 | 0.948 |
| FIFTH ORDER | 1.000 | 0.144 | 0.144 |
| SEVENTH ORDER | 1.000 | 0.110 | 0.110 |
| ELEVENTH ORDER | 1.000 | 0.000 | 0.000 |
| THIRTEENTH ORDER | 1.000 | 0.000 | 0.000 |
| SEVENTEENTH ORDER | 1.000 | 0.110 | 0.110 |
| NINETEENTH ORDER | 1.000 | 0.144 | 0.144 |

(b) B=0.5706A

| ORDER | FRACTIONAL PITCH WINDING COEFFICIENT Kp | DISTRIBUTED WINDING COEFFICIENT Kd | WINDING COEFFICIENT Kp×Kd |
|---|---|---|---|
| FIRST ORDER (FUNDAMENTAL WAVE) | 1.000 | 0.936 | 0.936 |
| FIFTH ORDER | 1.000 | 0.000 | 0.000 |
| SEVENTH ORDER | 1.000 | 0.218 | 0.218 |
| ELEVENTH ORDER | 1.000 | 0.123 | 0.123 |
| THIRTEENTH ORDER | 1.000 | 0.123 | 0.123 |
| SEVENTEENTH ORDER | 1.000 | 0.218 | 0.218 |
| NINETEENTH ORDER | 1.000 | 0.000 | 0.000 |

(c) B=1.795A

| ORDER | FRACTIONAL PITCH WINDING COEFFICIENT Kp | DISTRIBUTED WINDING COEFFICIENT Kd | WINDING COEFFICIENT Kp×Kd |
|---|---|---|---|
| FIRST ORDER (FUNDAMENTAL WAVE) | 1.000 | 0.960 | 0.960 |
| FIFTH ORDER | 1.000 | 0.291 | 0.291 |
| SEVENTH ORDER | 1.000 | 0.000 | 0.000 |
| ELEVENTH ORDER | 1.000 | 0.126 | 0.126 |
| THIRTEENTH ORDER | 1.000 | 0.126 | 0.126 |
| SEVENTEENTH ORDER | 1.000 | 0.000 | 0.000 |
| NINETEENTH ORDER | 1.000 | 0.291 | 0.291 |

| POSITION | PHASE | | NUMBER OF TURNS | |
|---|---|---|---|---|
| | UPPER | LOWER | UPPER | LOWER |
| No.1 | -V | U | n | n |
| No.2 | U | U | 0.6736n | 0.6736n |
| No.3 | U | U | 0.6736n | 0.6736n |
| No.4 | U | -W | n | n |
| No.5 | -W | -W | 0.6736n | 0.6736n |
| No.6 | -W | -W | 0.6736n | 0.6736n |
| No.7 | -W | V | n | n |
| No.8 | V | V | 0.6736n | 0.6736n |
| No.9 | V | V | 0.6736n | 0.6736n |
| No.10 | V | -U | n | n |
| No.11 | -U | -U | 0.6736n | 0.6736n |
| No.12 | -U | -U | 0.6736n | 0.6736n |
| No.13 | -U | W | n | n |
| No.14 | W | W | 0.6736n | 0.6736n |
| No.15 | W | W | 0.6736n | 0.6736n |
| No.16 | W | -V | n | n |
| No.17 | -V | -V | 0.6736n | 0.6736n |
| No.18 | -V | -V | 0.6736n | 0.6736n |
| No.19(=No.1) | -V | U | n | n |
| ⋮ | ⋮ | ⋮ | ⋮ | ⋮ |

(n=INTEGER)

FIG.21
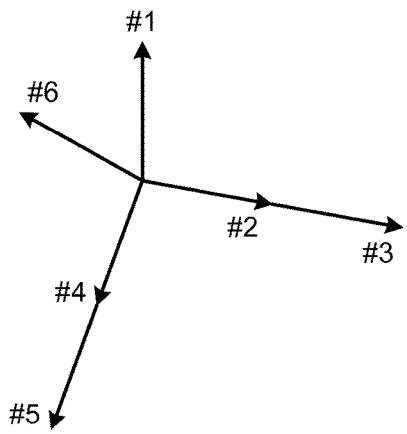
(a) FIFTH ORDER COMPONENT
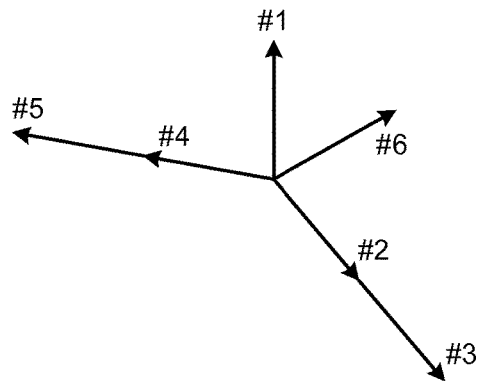
(b) SEVENTH ORDER COMPONENT
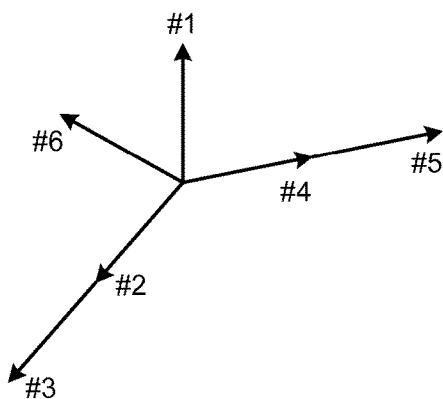
(c) ELEVENTH ORDER COMPONENT
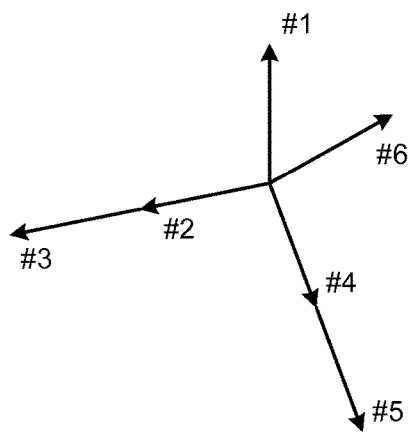
(d) THIRTEENTH ORDER COMPONENT
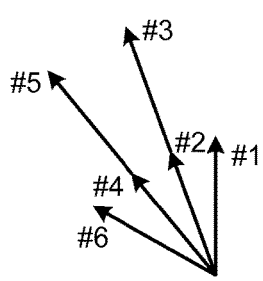
(e) SEVENTEENTH ORDER COMPONENT
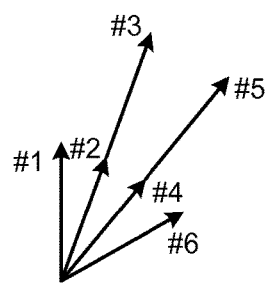
(f) NINETEENTH ORDER COMPONENT

| ORDER | FRACTIONAL PITCH WINDING COEFFICIENT Kp | DISTRIBUTED WINDING COEFFICIENT Kd | WINDING COEFFICIENT Kp×Kd |
|---|---|---|---|
| FIRST ORDER (FUNDAMENTAL WAVE) | 1.000 | 0.934 | 0.934 |
| FIFTH ORDER | 1.000 | 0.000 | 0.000 |
| SEVENTH ORDER | 1.000 | 0.173 | 0.173 |
| ELEVENTH ORDER | 1.000 | 0.173 | 0.173 |
| THIRTEENTH ORDER | 1.000 | 0.000 | 0.000 |
| SEVENTEENTH ORDER | 1.000 | 0.934 | 0.934 |
| NINETEENTH ORDER | 1.000 | 0.934 | 0.934 |

(b)B=1.266A

| ORDER | FRACTIONAL PITCH WINDING COEFFICIENT Kp | DISTRIBUTED WINDING COEFFICIENT Kd | WINDING COEFFICIENT Kp×Kd |
|---|---|---|---|
| FIRST ORDER (FUNDAMENTAL WAVE) | 1.000 | 0.951 | 0.951 |
| FIFTH ORDER | 1.000 | 0.216 | 0.216 |
| SEVENTH ORDER | 1.000 | 0.000 | 0.000 |
| ELEVENTH ORDER | 1.000 | 0.000 | 0.000 |
| THIRTEENTH ORDER | 1.000 | 0.216 | 0.216 |
| SEVENTEENTH ORDER | 1.000 | 0.951 | 0.951 |
| NINETEENTH ORDER | 1.000 | 0.951 | 0.951 |

| POSITION | PHASE | | NUMBER OF TURNS | |
|---|---|---|---|---|
| | UPPER | LOWER | UPPER | LOWER |
| No.1 | -V | U | n | n |
| No.2 | U | U | 0.9519n | 0.9519n |
| No.3 | U | U | 0.9519n | 0.9519n |
| No.4 | U | U | 0.9519n | 0.9519n |
| No.5 | U | U | 0.9519n | 0.9519n |
| No.6 | U | U | 0.9519n | 0.9519n |
| No.7 | U | -W | n | n |
| No.8 | -W | -W | 0.9519n | 0.9519n |
| No.9 | -W | -W | 0.9519n | 0.9519n |
| No.10 | -W | -W | 0.9519n | 0.9519n |
| No.11 | -W | -W | 0.9519n | 0.9519n |
| No.12 | -W | -W | 0.9519n | 0.9519n |
| No.13 | -W | V | n | n |
| No.14 | V | V | 0.9519n | 0.9519n |
| No.15 | V | V | 0.9519n | 0.9519n |
| No.16 | V | V | 0.9519n | 0.9519n |
| No.17 | V | V | 0.9519n | 0.9519n |
| No.18 | V | V | 0.9519n | 0.9519n |
| No.19 | V | -U | n | n |
| No.20 | -U | -U | 0.9519n | 0.9519n |
| No.21 | -U | -U | 0.9519n | 0.9519n |
| No.22 | -U | -U | 0.9519n | 0.9519n |
| No.23 | -U | -U | 0.9519n | 0.9519n |
| No.24 | -U | -U | 0.9519n | 0.9519n |
| No.25 | -U | W | n | n |
| No.26 | W | W | 0.9519n | 0.9519n |
| No.27 | W | W | 0.9519n | 0.9519n |
| No.28 | W | W | 0.9519n | 0.9519n |
| No.29 | W | W | 0.9519n | 0.9519n |
| No.30 | W | W | 0.9519n | 0.9519n |
| No.31 | W | -V | n | n |
| No.32 | -V | -V | 0.9519n | 0.9519n |
| No.33 | -V | -V | 0.9519n | 0.9519n |
| No.34 | -V | -V | 0.9519n | 0.9519n |
| No.35 | -V | -V | 0.9519n | 0.9519n |
| No.36 | -V | -V | 0.9519n | 0.9519n |
| No.37(=No.1) | -V | U | n | n |
| ⋮ | ⋮ | ⋮ | ⋮ | ⋮ |

(n=INTEGER)

FIG.24
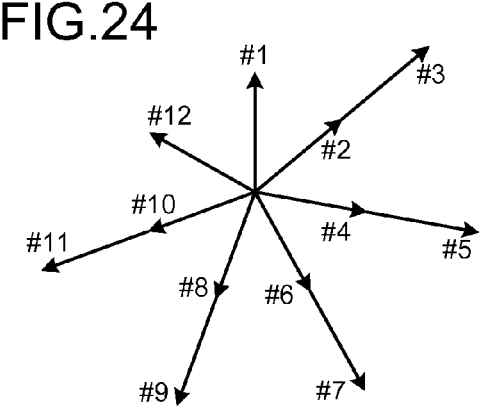
(a) FIFTH ORDER COMPONENT
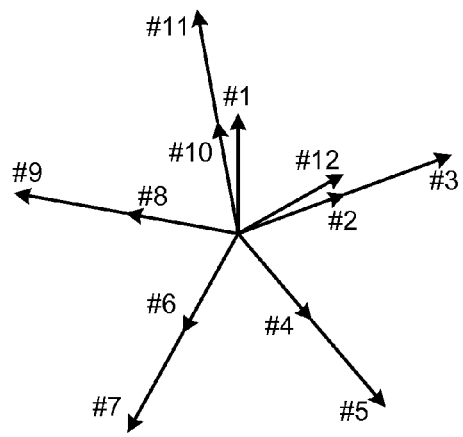
(b) SEVENTH ORDER COMPONENT
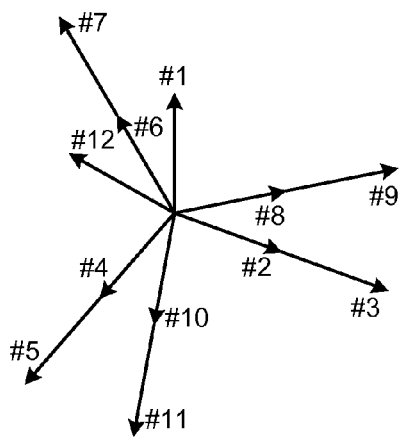
(c) ELEVENTH ORDER COMPONENT
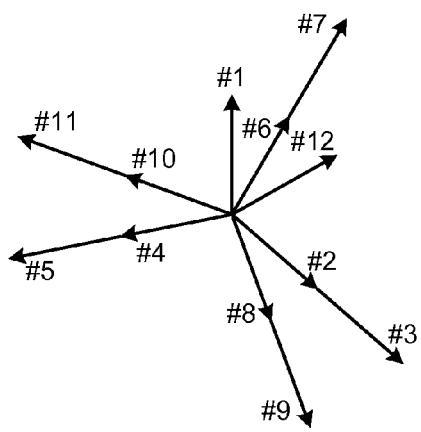
(d) THIRTEENTH ORDER COMPONENT
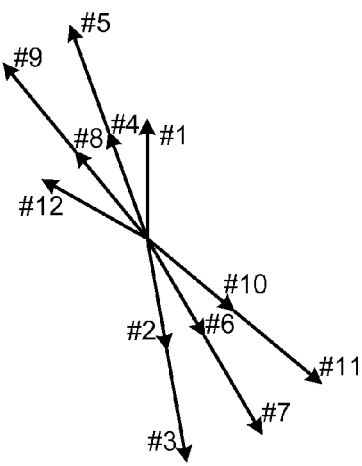
(e) SEVENTEENTH ORDER COMPONENT
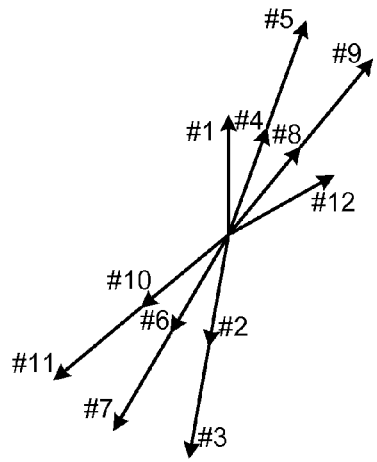
(f) NINETEENTH ORDER COMPONENT

| ORDER | FRACTIONAL PITCH WINDING COEFFICIENT Kp | DISTRIBUTED WINDING COEFFICIENT Kd | WINDING COEFFICIENT Kp×Kd |
|---|---|---|---|
| FIRST ORDER (FUNDAMENTAL WAVE) | 1.000 | 0.952 | 0.952 |
| FIFTH ORDER | 1.000 | 0.170 | 0.170 |
| SEVENTH ORDER | 1.000 | 0.125 | 0.125 |
| ELEVENTH ORDER | 1.000 | 0.051 | 0.051 |
| THIRTEENTH ORDER | 1.000 | 0.046 | 0.046 |
| SEVENTEENTH ORDER | 1.000 | 0.000 | 0.000 |
| NINETEENTH ORDER | 1.000 | 0.000 | 0.000 |

(b) B=0.4468A

| ORDER | FRACTIONAL PITCH WINDING COEFFICIENT Kp | DISTRIBUTED WINDING COEFFICIENT Kd | WINDING COEFFICIENT Kp×Kd |
|---|---|---|---|
| FIRST ORDER (FUNDAMENTAL WAVE) | 1.000 | 0.938 | 0.938 |
| FIFTH ORDER | 1.000 | 0.000 | 0.000 |
| SEVENTH ORDER | 1.000 | 0.247 | 0.247 |
| ELEVENTH ORDER | 1.000 | 0.100 | 0.100 |
| THIRTEENTH ORDER | 1.000 | 0.180 | 0.180 |
| SEVENTEENTH ORDER | 1.000 | 0.142 | 0.142 |
| NINETEENTH ORDER | 1.000 | 0.142 | 0.142 |

FIG.27

| SLOT No. | PHASE | | NUMBER OF TURNS | |
|---|---|---|---|---|
| | UPPER | LOWER | UPPER | LOWER |
| No.1 | -V | U | $n$ | $n$ |
| No.2 | -V | U | $n$ | $n$ |
| No.3 | U | U | $\frac{\sqrt{3}}{2}n$ | $\frac{\sqrt{3}}{2}n$ |
| No.4 | U | U | $\frac{\sqrt{3}}{2}n$ | $\frac{\sqrt{3}}{2}n$ |
| No.5 | U | -W | $n$ | $n$ |
| No.6 | U | -W | $n$ | $n$ |
| No.7 | -W | -W | $\frac{\sqrt{3}}{2}n$ | $\frac{\sqrt{3}}{2}n$ |
| No.8 | -W | -W | $\frac{\sqrt{3}}{2}n$ | $\frac{\sqrt{3}}{2}n$ |
| No.9 | -W | V | $n$ | $n$ |
| No.10 | -W | V | $n$ | $n$ |
| No.11 | V | V | $\frac{\sqrt{3}}{2}n$ | $\frac{\sqrt{3}}{2}n$ |
| No.12 | V | V | $\frac{\sqrt{3}}{2}n$ | $\frac{\sqrt{3}}{2}n$ |
| No.13 | V | -U | $n$ | $n$ |
| No.14 | V | -U | $n$ | $n$ |
| No.15 | -U | -U | $\frac{\sqrt{3}}{2}n$ | $\frac{\sqrt{3}}{2}n$ |
| No.16 | -U | -U | $\frac{\sqrt{3}}{2}n$ | $\frac{\sqrt{3}}{2}n$ |
| No.17 | -U | W | $n$ | $n$ |
| No.18 | -U | W | $n$ | $n$ |
| No.19 | W | W | $\frac{\sqrt{3}}{2}n$ | $\frac{\sqrt{3}}{2}n$ |
| No.20 | W | W | $\frac{\sqrt{3}}{2}n$ | $\frac{\sqrt{3}}{2}n$ |
| No.21 | W | -V | $n$ | $n$ |
| No.22 | W | -V | $n$ | $n$ |
| No.23 | -V | -V | $\frac{\sqrt{3}}{2}n$ | $\frac{\sqrt{3}}{2}n$ |
| No.24 | -V | -V | $\frac{\sqrt{3}}{2}n$ | $\frac{\sqrt{3}}{2}n$ |
| No.25(=No.1) | -V | U | $n$ | $n$ |
| ⋮ | ⋮ | ⋮ | ⋮ | ⋮ |

($n$=INTEGER)

FIG.28
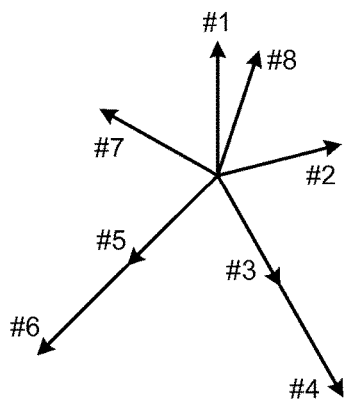
(a) FIFTH ORDER COMPONENT
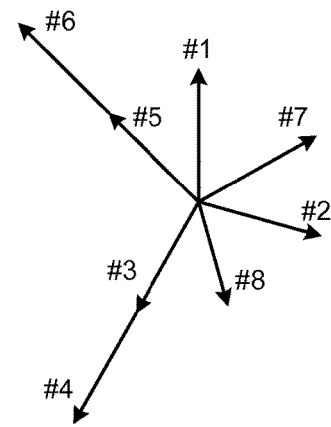
(b) SEVENTH ORDER COMPONENT
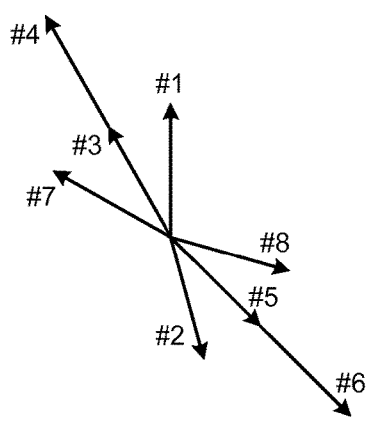
(c) ELEVENTH ORDER COMPONENT
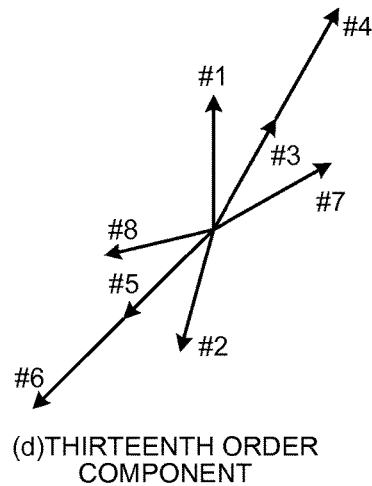
(d) THIRTEENTH ORDER COMPONENT
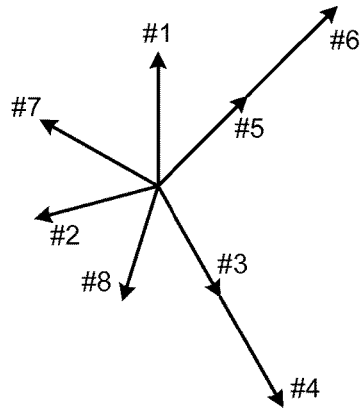
(e) SEVENTEENTH ORDER COMPONENT
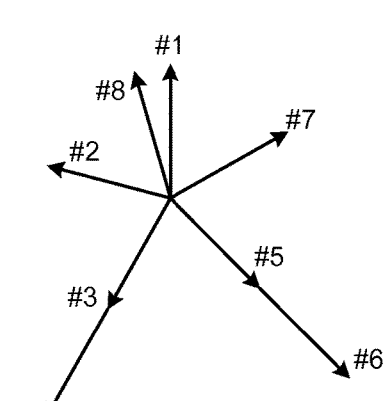
(f) NINETEENTH ORDER COMPONENT

| ORDER | FRACTIONAL PITCH WINDING COEFFICIENT Kp | DISTRIBUTED WINDING COEFFICIENT Kd | WINDING COEFFICIENT Kp×Kd |
|---|---|---|---|
| FIRST ORDER (FUNDAMENTAL WAVE) | 1.000 | 0.920 | 0.920 |
| FIFTH ORDER | 1.000 | 0.000 | 0.000 |
| SEVENTH ORDER | 1.000 | 0.000 | 0.000 |
| ELEVENTH ORDER | 1.000 | 0.121 | 0.121 |
| THIRTEENTH ORDER | 1.000 | 0.121 | 0.121 |
| SEVENTEENTH ORDER | 1.000 | 0.000 | 0.000 |
| NINETEENTH ORDER | 1.000 | 0.000 | 0.000 |

| POSITION | PHASE | | NUMBER OF TURNS | |
|---|---|---|---|---|
| | UPPER | LOWER | UPPER | LOWER |
| No.1 | -V | U | n | n |
| No.2 | U | U | n | n |
| No.3 | U | -W | n | n |
| No.4 | -W | -W | n | n |
| No.5 | -W | V | n | n |
| No.6 | V | V | n | n |
| No.7 | V | -U | n | n |
| No.8 | -U | -U | n | n |
| No.9 | -U | W | n | n |
| No.10 | W | W | n | n |
| No.11 | W | -V | n | n |
| No.12 | -V | -V | n | n |
| No.13(=No.1) | -V | U | n | n |
| No.14(=No.2) | U | U | n | n |
| No.15(=No.3) | U | -W | n | n |
| ⋮ | ⋮ | ⋮ | ⋮ | ⋮ |

(n=INTEGER)

| ORDER | FRACTIONAL PITCH WINDING COEFFICIENT Kp | DISTRIBUTED WINDING COEFFICIENT Kd | WINDING COEFFICIENT Kp×Kd |
|---|---|---|---|
| FIRST ORDER (FUNDAMENTAL WAVE) | 0.966 | 0.966 | 0.933 |
| FIFTH ORDER | 0.259 | 0.259 | 0.067 |
| SEVENTH ORDER | 0.259 | 0.259 | 0.067 |
| ELEVENTH ORDER | 0.966 | 0.966 | 0.933 |
| THIRTEENTH ORDER | 0.966 | 0.966 | 0.933 |
| SEVENTEENTH ORDER | 0.259 | 0.259 | 0.067 |
| NINETEENTH ORDER | 0.259 | 0.259 | 0.067 |

| ORDER | FRACTIONAL PITCH WINDING COEFFICIENT Kp | DISTRIBUTED WINDING COEFFICIENT Kd | WINDING COEFFICIENT Kp×Kd |
|---|---|---|---|
| FIRST ORDER (FUNDAMENTAL WAVE) | 1.000 | 0.933 | 0.933 |
| FIFTH ORDER | 1.000 | 0.067 | 0.067 |
| SEVENTH ORDER | 1.000 | 0.067 | 0.067 |
| ELEVENTH ORDER | 1.000 | 0.933 | 0.933 |
| THIRTEENTH ORDER | 1.000 | 0.933 | 0.933 |
| SEVENTEENTH ORDER | 1.000 | 0.067 | 0.067 |
| NINETEENTH ORDER | 1.000 | 0.067 | 0.067 |

ROTARY ELECTRIC MACHINE

CROSS REFERENCE TO RELATED APPLICATIONS

This application is a National Stage of International Application No. PCT/JP2012/082406, filed on Dec. 13, 2012, the contents of all of which are incorporated herein by reference in their entirety.

FIELD

The present invention relates to a rotary electric machine.

BACKGROUND

For improvement of the performance of a mechanical apparatus, low torque pulsation and low vibration are required of a rotary electric machine used in the mechanical apparatus. The torque of a permanent magnet-type rotary electric machine and an induction-type rotary electric machine includes a pulsation component caused by harmonic components (magnetomotive force harmonic components) of an induced voltage.

Patent Literature 1 mentions that, in an armature winding wire, a coil having a concentric shape is configured by changing the number of turns of each phase in each slot to 5, 13, 21, 28, 28, 21, 13, and 5. Consequently, according to Patent Literature 1, it is possible to form an electromotive force distribution of a winding wire in a sine wave shape and greatly reduce a harmonic winding coefficient.

Patent Literature 2 mentions that, in an armature winding wire, a winding wire having a concentric shape is configured by changing the number of turns of each phase in each slot to 31, 18, 12, 12, 18, and 31. Consequently, according to Patent Literature 2, it is possible to form an electromotive force distribution of the winding wire in a substantial sine wave shape and greatly reduce a harmonic winding coefficient.

CITATION LIST

Patent Literature

Patent Literature 1: Japanese Patent Application Laid-Open No. H6-261479
Patent Literature 2: Japanese Patent Application Laid-Open No. H9-121491

SUMMARY

Technical Problem

The technology described in Patent Literatures 1 and 2 is a technology for changing the number of turns of each phase in each slot in a sine wave shape, and a winding configuration of an armature (a rotary electric machine) is complicated as a whole. Therefore, in the technology described in Patent Literatures 1 and 2, it is considered difficult to improve the productivity of the rotary electric machine.

In the technology described in Patent Literatures 1 and 2, harmonic winding coefficients of $6n\pm1$-th orders are values exceeding 0.01, and a harmonic winding coefficient of a practically unignorable level remains. Therefore, it is considered difficult to reduce torque pulsation and vibration sound due to harmonics of the $6n\pm1$-th orders to a practically ignorable level.

The present invention has been devised in view of the above and it is an object of the present invention to obtain a rotary electric machine that can reduce, with a simple configuration, a harmonic winding coefficient to a practically ignorable level.

Solution to Problem

In order to solve the aforementioned problems, a rotary electric machine including a stator of a distributed winding type including a plurality of first slots, in each of which winding wires of a plurality of same phases or a winding wire of one phase are arranged, and a plurality of second slots, in each of which winding wires of a plurality of different phases are arranged according to one aspect of the present invention is constructed such that a total number of turns in each of the first slots is same as one another, a total number of turns in each of the second slots is same as one another, and the total number of turns in the first slot and the total number of turns in the second slot are different from each other.

Advantageous Effects of Invention

According to the present invention, because two kinds of number of turns are used in total, compared with when the number of turns of each phase in each slot is changed in a sine wave shape, it is possible to simplify a winding configuration in the rotary electric machine. Because a first slot and a second slot have different configurations concerning phases, by setting the total number of turns in the first slot and the total number of turns in the second slot to be different from each other, it is possible to reduce harmonic winding coefficients of, for example, a fifth order, a seventh order, a seventeenth order, and a nineteenth order among harmonic winding coefficients of $6n\pm1$-th orders to a practically ignorable level. That is, it is possible to reduce, with a simple configuration, a harmonic winding coefficient to a practically ignorable level.

BRIEF DESCRIPTION OF DRAWINGS

FIG. 3 is a diagram of allocation of phases and turn ratios of winding wires in each slot according to the first embodiment.
FIG. 6 is a diagram of winding coefficients of the rotary electric machine according to the first embodiment.

FIG. 11 is a diagram of allocation of phases and turn ratios of winding wires in each slot according to the second embodiment.

FIG. 15 is a diagram of allocation of phases and turn ratios of winding wires in each slot according to the fourth embodiment.

FIG. 16 is a vector diagram of a phase relation among harmonic components of induced voltages of a #1 winding wire to a #8 winding wire according to the fourth embodiment.

FIG. 17 is a diagram of winding coefficients of the rotary electric machine according to the fourth embodiment.

FIG. 20 is a diagram of allocation of phases and turn ratios of winding wires in each slot according to a sixth embodiment.

FIG. 21 is a vector diagram of a phase relation among harmonic components of induced voltages of a #1 winding wire to a #6 winding wire according to the sixth embodiment.

FIG. 22 is a diagram of winding coefficients of a rotary electric machine according to the sixth embodiment.

FIG. 23 is a diagram of allocation of phases and turn ratios of winding wires in each slot according to a seventh embodiment.

FIG. 24 is a vector diagram of a phase relation among harmonic components of induced voltages of a #1 winding wire to a #12 winding wire according to the seventh embodiment.

FIG. 25 is a diagram of winding coefficients of a rotary electric machine according to the seventh embodiment.

FIG. 27 is a diagram of allocation of phases and turn ratios of winding wires in each slot according to the eight embodiment.

FIG. 28 is a vector diagram of a phase relation among harmonic components of induced voltages of a #1 winding wire to a #12 winding wire according to the eighth embodiment.

FIG. 31 is a diagram of allocation of phases and turn ratios of winding wires in each slot in the past in a comparative example (a rotary electric machine with q=2).

DESCRIPTION OF EMBODIMENTS

Exemplary embodiments of a rotary electric machine according to the present invention are explained in detail below with reference to the drawings. Note that the present invention is not limited by the embodiment.

First Embodiment

A rotary electric machine 1 according to the first embodiment is explained.

The rotary electric machine 1 includes a stator and a rotor. The rotor rotates with respect to the stator. The rotary electric machine 1 transmits rotational power to a mechanical apparatus (not shown in the figure) via a shaft (not shown in the figure) fixed to the rotor and operates the mechanical apparatus. The rotary electric machine 1 is, for example, a permanent magnet-type rotary electric machine or an induction-type rotary electric machine. In the rotary electric machine 1, for example, a winding structure in a stator 20 is contrived.

Figure 1:
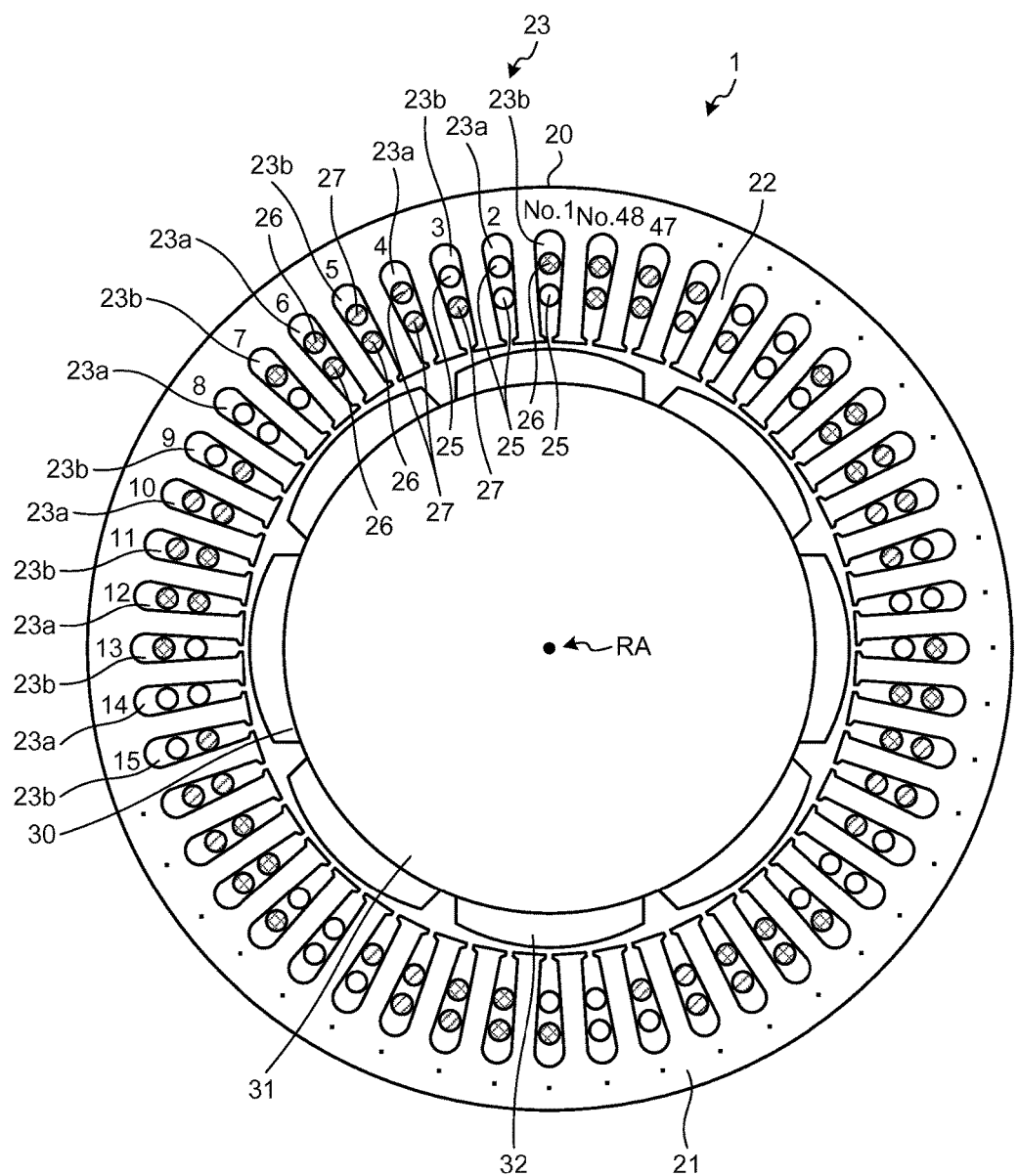
FIG. 1 is a diagram of a sectional view of a rotary electric machine according to a first embodiment.
Figure 2:
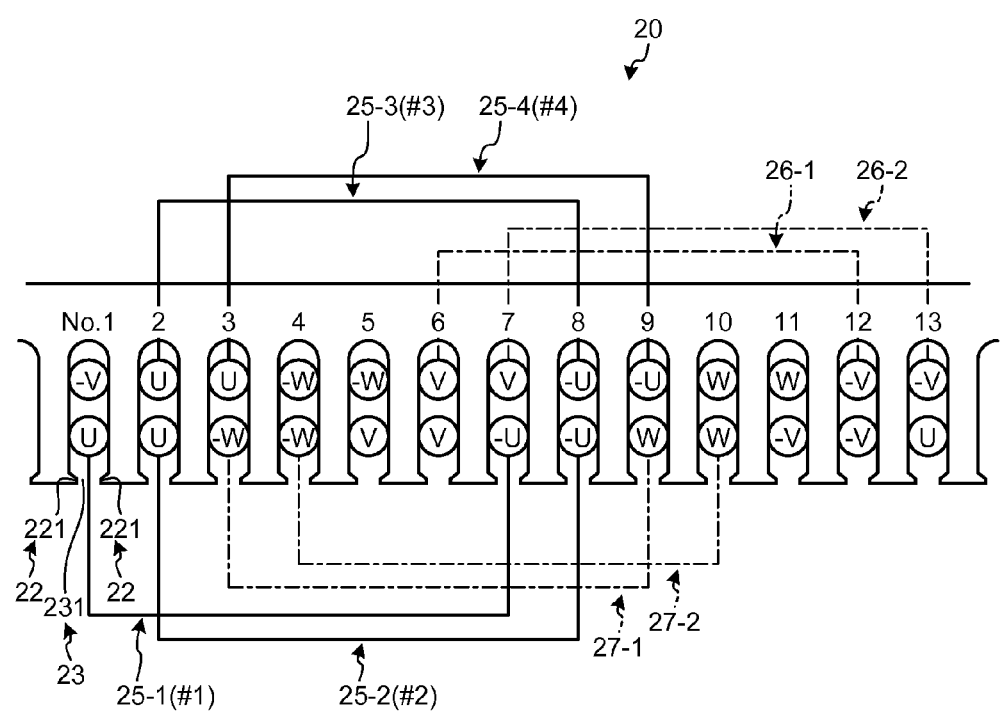
FIG. 2 is a diagram of coil arrangements in each slot according to the first embodiment.

Specifically, the rotary electric machine 1 includes a configuration shown in FIG. 1 to FIG. 3. FIG. 1 is a diagram of the configuration of a cross section perpendicular to a rotation axis RA in the rotary electric machine 1. FIG. 2 is a schematic diagram of coil arrangements in each slot. FIG. 3 is a diagram of allocation of phases and turn ratios of winding wires in each slot. In FIG. 1 to FIG. 3, for example, as the rotary electric machine 1, a rotary electric machine in which the number of poles is eight, the number of slots is forty-eight, the number of phases is three, and the number of slots q in each pole and each phase is two is illustratively shown.

The rotary electric machine 1 includes, as shown in FIG. 1, a rotor 30 and a stator 20. The rotor 30 includes a rotor core 31 and a plurality of permanent magnets 32. The rotor core 31 is configured to be concentric with a shaft. The rotor core 31 has, for example, a substantially columnar shape having a rotation axis RA extending along the shaft. For example, the permanent magnets 32 are arranged along the circumferential surface of the rotor core 31.

The stator 20 is configured to house the rotor 30 while being separated from the rotor 30. The stator 20 includes, for example, a stator core 21, a plurality of teeth 22, and a plurality of slots 23. The stator core 21 is configured to be concentric with the shaft. The stator core 21 has, for example, a substantially columnar shape having the rotation axis RA extending along the shaft. The stator core 21 is formed of, for example, a laminated electromagnetic steel sheet or the like.

The teeth 22 extend along the radial direction from the stator core 21 toward the rotation axis RA. Base side end portions of the teeth 22 are coupled to the stator core 21 in a ring shape. Slots 23 are each formed between the teeth 22 adjacent to each other. For example, in FIG. 1, the slots 23 are arranged in positions indicated by slot numbers No. 1 to No. 48 along the stator core 21.

For example, as shown in FIG. 2, a slot inlet 231 of the slot 23 is formed between brim sections 221 and 221 of the adjacent teeth 22. The space in each of the slots 23 extends in the radial direction from the slot inlet 231. In the space in each slot 23, winding wires 25 to 27 of each phase are arranged in a plurality of stages along the radial direction. For example, in FIG. 1, winding wires 25 without hatching represent winding wires of a U phase. Winding wires 26 indicated by cross hatching represent winding wires of a V phase. Winding wires 27 indicated by hatching of oblique lines represent winding wires of a W phase.

The slots 23 include, for example, a plurality of first slots 23a and a plurality of second slots 23b. In the first slots 23a, winding wires of a plurality of the same phases are arranged. For example, in the first slot 23a located in the slot number No. 2, two winding wires 25 of the U phase are arranged in two stages along the radial direction. For example, in the first slot 23a located in the slot number No. 4, two winding wires 27 of the W phase are arranged in two stages along the radial direction. For example, in the first slot 23a located in the slot number No. 6, two winding wires 26 of the V phase are arranged in two stages along the radial direction.

In the second slots 23b, winding wires of a plurality of different phases are arranged. For example, in the second slot 23b located in the slot number No. 1, the winding wire 25 of the U phase and the winding wire 26 of the V phase are arranged in two stages from the rotation axis RA side along the radial direction. For example, in the second slot 23b located in the slot number No. 3, the winding wire 27 of the W phase and the winding wire 25 of the U phase are arranged in two stages from the rotation axis RA side along the radial direction. For example, in the second slot 23b located in the slot number No. 5, the winding wire 26 of the V phase and the winding wire 27 of the W phase are arranged in two stages from the rotation axis RA side along the radial direction.

Concerning the slot numbers No. 1 to No. 48 along the stator core 21, when the number of slots q in each pole and each phase is 2i (i is an integer equal to or larger than 1), i first slots 23a and i second slots 23b are alternately arranged. For example, in the case shown in FIG. 1, because i=1, one first slot 23a and one second slot 23b are alternately arranged. That is, the first slots 23a and the second slots 23b are respectively arranged at a cycle of two slot numbers. Pitches of the arrangement of the first slots 23a and the second slots 23b shift from each other by one slot number. For example, the first slots 23a are arranged in positions of even numbers of the slot numbers. The second slots 23b are arranged in positions of even number of the slot numbers.

In the stator 20, a distributed winding method is adopted as a method of winding the winding wires. In the distributed winding method, for example, as shown in FIG. 2, the winding wires 25 to 27 of each phase are wound around to be distributed in the slots 23, that is, to extend over the teeth 22.

For example, a winding wire 25-1 (a #1 winding wire) of the U phase is wound around to be distributed from the rotation axis RA side in the slots 23 (the second slot 23b) located in the slot number No. 1 to the rotation axis RA side in the slot 23 (the second slot 23b) located in the slot number No. 7.

For example, a winding wire 25-2 (a #2 winding wire) of the U phase is wound around to be distributed from the rotation axis RA side in the slots 23 (the first slot 23a) located in the slot number No. 2 to the rotation axis RA side in the slot 23 (the first slot 23a) located in the slot number No. 8.

For example, a winding wire 25-3 (a #3 winding wire) of the U phase is wound around to be distributed from the stator core 21 side in the slots 23 (the first slot 23a) located in the slot number No. 2 to the stator core 21 side in the slot 23 (the first slot 23a) located in the slot number No. 8.

For example, a winding wire 25-4 (a #4 winding wire) of the U phase is wound around to be distributed from the stator core 21 side in the slots 23 (the second slot 23b) located in the slot number No. 3 to the stator core 21 side in the slot 23 (the second slot 23b) located in the slot number No. 9.

For example, a winding wire 26-1 of the V phase is wound around to be distributed from the stator core 21 side in the slots 23 (the first slot 23a) located in the slot number No. 6 to the stator core 21 side in the slot 23 (the first slot 23a) located in the slot number No. 12.

For example, a winding wire 26-2 of the V phase is wound around to be distributed from the stator core 21 side in the slots 23 (the second slot 23b) located in the slot number No. 7 to the stator core 21 side in the slot 23 (the second slot 23b) located in the slot number No. 13.

For example, a winding wire 27-1 of the W phase is wound around to be distributed from the rotation axis RA side in the slots 23 (the second slot 23b) located in the slot number No. 3 to the rotation axis RA side in the slot 23 (the second slot 23b) located in the slot number No. 9.

For example, a winding wire 27-2 of the W phase is wound around to be distributed from the rotation axis RA side in the slots 23 (the first slot 23a) located in the slot number No. 4 to the rotation axis RA side in the slot 23 (the first slot 23a) located in the slot number No. 10.

The stator 20 of the rotary electric machine 1 includes, for example, a configuration shown in FIG. 3 concerning the numbers of turns of the winding wires. In FIG. 3, the stator core 21 side in the space in the slot 23 is indicated as "upper side" and the rotation axis RA side is indicated as "lower side".

For example, a total number of turns (total number of conductors) in each of the first slots 23a located in the even number of the slot numbers is the number of turns on the upper side+the number of turns on the lower side=$\{\sqrt{(3)}/2\}n+\{\sqrt{(3)}/2\}n=\sqrt{(3)}n$, and is the same as one another. For example, in the first slot 23a located in the slot number No. 2, the total number of turns will be the number of turns of the U phase on the upper side+the number of turns of the U phase on the lower side=$\{\sqrt{(3)}/2\}n+\{\sqrt{(3)}/2\}n=\sqrt{/(3)}n$. For example, in the first slot 23a located in the slot number No. 4, the number of turns of the W phase on the upper side+the number of turns of the W phase on the lower side=$\{\sqrt{(3)}/2\}n+\{\sqrt{(3)}/2\}n=\sqrt{(3)}n$.

For example, a total number of turns (total number of conductors) in the second slots 23b located in the odd numbers of the slot numbers is the number of turns on the upper side+the numbers of turns on the lower side=n+n=2n, and is the same as one another. For example, in the second slot 23b located in the slot number No. 1, the number of turns of the V phase on the upper side+the number of turns of the U phase on the lower side=n+n=2n. For example, in the second slot 23b located in the slot number No. 3, the number of turns of the U phase on the upper side+the number of turns of the W phase on the lower side=n+n=2n.

For example, a total number of turns (a total number of conductors) in the first slot 23a and a total number of turns (a total number of conductors) in the second slot 23b are different from each other. For example, the total number of turns in the first slot 23a and the total number of turns in the second slot 23b are different from each other such that harmonic components of an induced voltage are zero (see FIG. 6). That is, the number of turns of the phases arranged in the slots 23 are set to be different in the first slot 23a in which the winding wires of the same phase are arranged and the second slot 23b in which the winding wires of the different phases are arranged, and two kinds of number of turns in total are used.

For example, when the number of poles is represented as P, the number of slots is represented as S, the number of phases of a power supply is represented as m, and the number of slots in each pole and each phase is represented as q=S/P/m, if the number of slots q in each pole and each phase is 2i (i is an integer equal to or larger than 1), a ratio of the total number of turns in the first slot 23a and the total number of turns in the second slot 23b is preferably, for example, 0.85√(3):2 to 1.15√(3):2.

If the ratio of the total number of turns in the first slot 23a and the total number of turns in the second slot 23b is smaller than 0.85√(3):2 (that is, when the total number of turns in the second slot 23b is 2, the total number of turns in the first slot 23a is smaller than 0.85√(3)), the number of turns of the winding wires of different phases is too large with respect to the number of turns of the winding wires of the same phase. Therefore, it is likely that the harmonic components of an induced voltage (that is, harmonic winding coefficients) becomes are large, exceeding a practically ignorable level.

Alternatively, if the ratio of the total number of turns in the first slot 23a and the total number of turns in the second slot 23b is larger than 1.15√(3):2 (that is, when the total number of turns in the second slot 23b is 2, the total number of turns in the first slot 23a is larger than 1.15√(3)), the number of turns of the winding wires of the same phase is too large with respect to the number of turns of the winding wires of different phases. Therefore, it is likely that the harmonic components of an induced voltage (that is, harmonic winding coefficients) becomes large, exceeding the practically ignorable level.

For example, in the first embodiment, when the number of turns (the number of conductors) of the U-phase winding wires arranged in No. 1 to No. 3 are respectively represented as U1 (No. 1 lower), U2 (No. 2 upper), U3 (No. 2 lower), and U4 (No. 3 upper), a turn ratio of U1 to U4 is set to be the following Formula (1). Note that the number of same-phase winding wires is 2q, which twice as large as the number of slots in each pole and each phase.

$$U1:U2:U3:U4=1:\sqrt{3}/2:\sqrt{3}/2:1 \quad (1)$$

Note that, concerning the V phase and the W phase, the respective turn ratios are as shown in FIG. 3.

Effects of a torque pulsation reduction according to this embodiment are explained with reference to an example in which the rotary electric machine 1 is, for example, a permanent magnet-type rotary electric machine. The torque of the rotary electric machine 1 (the permanent magnet-type rotary electric machine) is generally proportional to a product of an induced voltage generated by a permanent magnet and an electric current energized to the winding wires. Therefore, if the induced voltage and an energized current waveform are ideal sine wave shapes, the generated torque is a fixed value. However, if harmonic components are included in the induced voltage, torque pulsation occurs. In particular, in torque pulsation of a rotary electric machine of three phases, components 6n times (6f, 12f, or 18f) as large as a power supply frequency are generated, wherein the torque pulsation is caused by harmonic components of 6n±1-th orders of the induced voltage. For example, torque pulsation of the 6f component is caused by harmonic components of a fifth order and a seventh order. Torque pulsation of the 12f component is caused by harmonic components of an eleventh order and a thirteenth order. Torque pulsation of the 18f component is caused by harmonic components of a seventeenth order and a nineteenth order.

Therefore, in order to reduce the torque pulsation of the rotary electric machine 1 to a practically ignorable level, it is necessary to reduce harmonic components of the induced voltage to a practically ignorable level. The harmonic components of the induced voltage of the rotary electric machine 1 (the permanent magnet-type rotary electric machine) are generated because of a magnet shape. However, it is possible to reduce the harmonic components to a certain degree depending on a combination of the number of poles and the number of slots. This is because it is possible to reduce, depending on a combination of the number of poles and the number of slots, harmonic components of a magnetic flux interlinked with the winding wires. In the rotary electric machine 1, in general, examination is performed using a coefficient called winding coefficient. In this embodiment as well, the effects of this embodiment are explained using the winding coefficient.

In the explanation of the effects of reducing the harmonic components of the induced voltage according to this embodiment, first, a winding coefficient in a structure of a comparative example is explained. As a comparative example corresponding to the rotary electric machine 1 shown in FIG. 1 in which the number of poles is eight, the number of slots is forty-eight, the number of phases is three, the number of slots q in each pole and each phase is two, and the two winding wires of the same phase or different phases are arranged in one slot, a rotary electric machine 901 including the configuration of the numbers of turns shown in FIG. 31 is examined. In the rotary electric machine 901, as shown in FIG. 31, the number of turns in each slot is all the same. A connection diagram of the winding wires is as shown in FIG. 32.

A winding coefficient of the rotary electric machine 901 with q=2 shown in FIG. 31 is explained. The winding coefficient is calculated by a product of a fractional pitch winding coefficient Kp and a distributed winding coefficient Kd. The fractional pitch winding coefficient indicates that an induced voltage decrease because a coil pitch=the number of teeth over which a coil extends×a teeth pitch (a stator inner diameter/the number of teeth) and a pole pitch (a stator inner diameter/the number of poles) are different. Therefore, the fractional pitch winding coefficient Kp can be calculated by the following Formula (2) from the number of poles, the number of slots, and a coil throw (the number of teeth over which a winding wire extends).

$$Kp=\sin(\text{order}\times 180\times \text{the number of poles/the number of slots}\times \text{coil throw}/2) \quad (2)$$

Figures 32, 33:
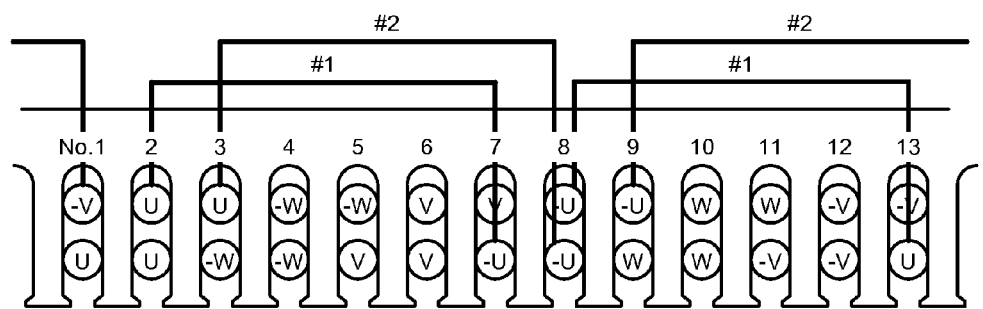
FIG. 32 is a diagram of connection of wires in the comparative example (the rotary electric machine with q=2).
FIG. 33 is a diagram of winding coefficients of the rotary electric machine in which the winding wires are connected as shown in FIG. 32 in the comparative example (the rotary electric machine with q=2).

From a connection diagram of the winding wires shown in FIG. 32, the coil throw (the number of teeth over which the winding wires extends) is five. Therefore, order components of the fractional pitch winding coefficient are as shown in FIG. 33.

The distributed winding coefficient Kd indicates that, when a plurality of winding wires are connected in series for one phase, an induced voltage decreases because a phase difference occurs between the winding wires (between coils). Therefore, the distributed winding coefficient Kd can be calculated from the phase difference between the winding wires. When the phase difference between the winding wires is represented as α, because winding wires of the same phase are two winding wires, the #1 winding wire and the #2 winding wire, the distributed winding coefficient is as indicated by the following Formula (3).

$$Kd=\cos(\text{order}\times \alpha/2) \quad (3)$$

Note that a phase difference a between the winding wires can be calculated by the following Formula (4).

$$\alpha = 180 \times \text{the number of poles/the number of slots} \quad (4)$$

In the case of the rotary electric machine shown in FIG. 32, α is 30 degrees.

A winding coefficient calculated by the distributed winding coefficient calculated using Formulas (3) and (4) and a product of the distributed winding coefficient Kd and the fractional pitch winding coefficient Kp is shown in FIG. 33. As shown in FIG. 33, it is seen that, in the winding structure of the comparative example, all of harmonic components of a fifth order, a seventh order, an eleventh order, a thirteenth order, a seventeenth order, and a nineteenth order have large values exceeding a practically ignorable level (e.g., 0.01).

The winding coefficients are calculated assuming that, as shown in FIG. 32, the winding wires of the U phase in No. 2 upper and No. 7 lower are connected (the #1 winding wire) and the winding wirers of the U phase in No. 3 upper and No. 8 lower are connected (the #2 winding wire).

Figures 34, 35:
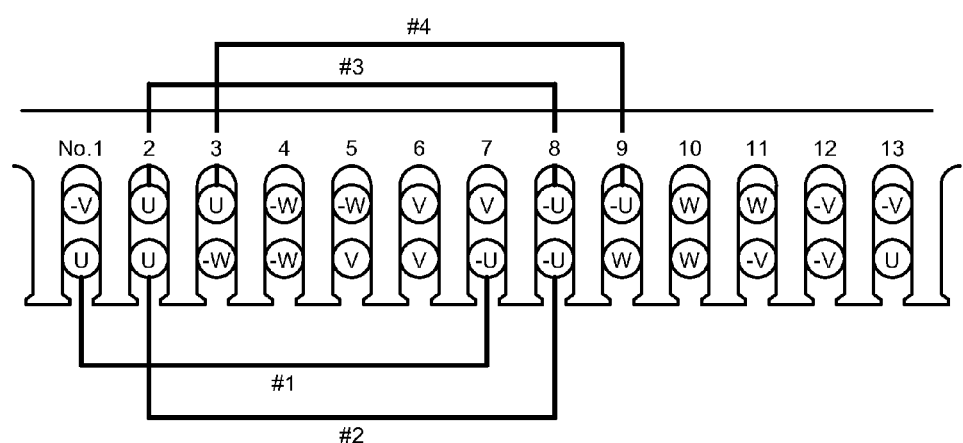
FIG. 34 is a diagram of connection of winding wires of the comparative example (the rotary electric machine with q=2).
FIG. 35 is a diagram of winding coefficients of the rotary electric machine in which the winding wires are connected as shown in FIG. 34 in the comparative example (the rotary electric machine with q=2).

On the other hand, as shown in FIG. 34, the winding coefficient can also be calculated by connecting the winding wires in No. 1 lower and No. 7 lower (the #1 winding wire), connecting the winding wires in No. 2 lower and No. 8 lower (the #2 winding wire), connecting the winding wires in No. 2 upper and No. 8 upper (the #3 winding wire), and connecting the winding wires in No. 3 upper and No. 9 upper (the #4 winding wire). In this case, because the coil throw (the number of teeth over which the winding wire extends) is six, the fractional pitch winding coefficient Kp is 1.0 from Formula (2). On the other hand, the distributed winding coefficient Kd is calculated from a phase difference among a plurality of coils of the same phase. However, the coils of the same phase are four winding wires, the #1 winding wire, the #2 winding wire, the #3 winding wire, and the #4 winding wire. Therefore, the distributed winding coefficient Kd is as indicated by the following Formula (5).

$$Kd = (2.0 + 2\cos(\text{order} \times \alpha/2))/4 \quad (5)$$

A winding coefficient calculated by the distributed winding coefficient Kd calculated using Formula (5) and the product of the distributed winding coefficient Kd and the fractional pitch winding coefficient Kp is shown in FIG. 35. From comparison of FIG. 33 and FIG. 35, it is seen that the winding coefficients are the same irrespective of a connecting method for the winding wires. In this specification, to simply perform derivation of the winding coefficient according to this embodiment, the winding coefficient is calculated assuming that the winding wires are connected such that the coil throw is the number of slots/the number of poles=6, that is, the fractional pitch winding coefficient Kp is 1.0.

The winding coefficient according to the first embodiment is explained. To simply derive the winding coefficient, assuming that the winding wires are connected as shown in FIG. 34, the #1 winding wire to the #4 winding wire (the winding wires 25-1 to 25-4) corresponding to the #1 winding wire to the #4 winding wire shown in FIG. 34 are examined. When the winding wires are connected as shown in FIG. 2, the coil throw is six. Therefore, as in the comparative example, the fractional pitch winding coefficient Kp is as indicated by the following Formula (6).

$$\begin{aligned}
Kp &= \sin(\text{order} \times 180 \times \text{the number of poles/the number of slots} \times \text{the coil throw}/2) \quad (6) \\
&= \sin(\text{order} \times 180 \times 8/48 \times 6/2) \\
&= \sin(\text{order} \times 90) \\
&= 1.0
\end{aligned}$$

Next, the distributed winding coefficient Kd is examined. To calculate the distributed winding coefficient Kd of the orders, a phase difference between induced voltages generated in the #1 winding wire to the #4 winding wire is calculated. The phase difference between induced voltages generated in the #1 winding wire and the #2 winding wire is calculated as α=180×the number of poles/the number of slots=30° from Formula (4). The #2 winding wire and the #3 winding wire have the same phase from FIG. 2. A phase difference of 30° occurs between the #3 winding wire and the #4 winding wire.

Figure 4:
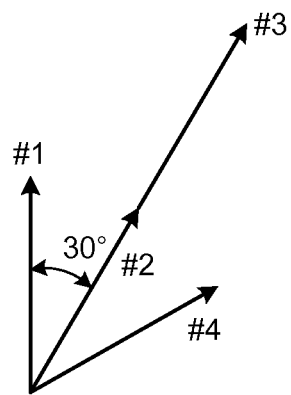
FIG. 4 is a vector diagram of a phase relation among fundamental wave components of induced voltages of a #1 winding wire to a #4 winding wire according to the first embodiment.

Vector representation of a phase difference among fundamental wave components of the #1 winding wire to the #4 winding wire is shown in FIG. 4. To examine harmonic components of a winding coefficient as well, vector representations of phase differences of fifth order, seventh order, eleventh order, thirteenth order, seventeenth order, and nineteenth order components of an induced voltage are respectively shown in FIGS. 5(*a*) to 5(*f*). The phase difference in each of FIGS. 5(*a*) to 5(*f*) is obtained by multiplying the phase difference calculated by Formula (4) with a harmonic order component. A state in which a phase difference of 30°×5=150° occurs in the case of the fifth order can be confirmed.

This embodiment is characterized in that the number of turns is changed in the first slot 23*a* in which the winding wires in the same phase are arranged and the second slot 23*b* in which the winding wires of different phases are arranged. Therefore, the distributed winding coefficient Kd in the rotary electric machine 1 in this embodiment needs to be calculated taking into account a phase difference among a plurality of winding wires of the same phase and also taking into account a difference in the numbers of turns of the #1 winding wire to the #4 winding wire. When the number of turns of the #1 winding wire and the #4 winding wire is represented as A and the number of turns of the #2 winding wire and the #3 winding wire is represented as B, the distributed winding coefficient Kd is as indicated by the following Formula (7).

$$\begin{aligned}
Kd &= (2B + 2A \times \cos(\text{order} \times \alpha))/(2A + 2B) \quad (7) \\
&= (2B + 2A \times \cos(\text{order} \times 30))/(2A + 2B)
\end{aligned}$$

When the number of turns of the #1 winding wire and the #4 winding wire is represented as A=n and the number of turns of the #2 winding wire and the #3 winding wire is represented as B={√(3)/2}n, the distributed winding coefficient Kd according to this embodiment is as indicated by the following Formula (8).

$$Kd = (\sqrt{3} + 2\cos(\text{order} \times 30))/(\sqrt{3} + 2) \quad (8)$$

Therefore, first order, fifth order, and seventh order components of the distributed winding coefficient Kd according to this embodiment are respectively as indicated by the following Formulas (9), (10), and (11).

$$Kd(\text{first order}) = (\sqrt{(3)} + 2\cos(1 \times 30))/(\sqrt{(3)} + 2) \quad (9)$$
$$= 0.928$$

$$Kd(\text{fifth order}) = (\sqrt{(3)} + 2\cos(5 \times 30))/(\sqrt{(3)} + 2) \quad (10)$$
$$= 0$$

$$Kd(\text{seventh order}) = (\sqrt{(3)} + 2\cos(7 \times 30))/(\sqrt{(3)} + 2) \quad (11)$$
$$= 0$$

Seventeenth and nineteenth order components are also calculated as 0.

The winding coefficients calculated in this way are shown in FIG. 6. As shown in FIG. 6, it is seen that, according to this embodiment, the fifth order, seventh order, seventeenth order, and nineteenth order components of the winding coefficients are approximately zero.

In the structure of the comparative example, as shown in FIG. 33 and FIG. 35, the winding coefficients of the fifth order, seventh order, seventeenth order, and nineteenth order components have large values exceeding the practically ignorable level (e.g., 0.01). Therefore, it is considered difficult to reduce torque pulsation to the practically ignorable level.

On the other hand, in this embodiment, it is possible to reduce, for example, the harmonic winding coefficients of the fifth order, seventh order, seventeenth order, and nineteenth order among the harmonic winding coefficients of the $6n\pm1$-th orders to the practically negligible level, for example, approximately zero. Therefore, it is considered possible to greatly reduce torque pulsation components and reduce torque pulsation and vibration sound to the practically negligible level.

As explained above, in the first embodiment, in the stator 20 of the rotary electric machine 1, the total number of turns in each of the first slots 23a is same as one another. The total number of turns in each of the second slots 23b is same as one another. The total number of turns (the total number of conductors) in the first slot 23a and the total number of turns (the total number of conductors) in the second slot 23b are different from each other. Consequently, because two kinds of number of turns are used in total, compared with when the number of turns of each of the slots of the phases is changed in a sine wave shape, it is possible to simplify the winding configuration in the rotary electric machine 1. Further, because the first slot 23a and the second slot 23b have the different configurations concerning the phase, by setting the total number of turns in the first slot 23a and the total number of turns in the second slot 23b different from each other, it is made possible to reduce the harmonic winding coefficients of, for example, the fifth order, the seventh order, the seventeenth order, and the nineteenth order among the harmonic winding coefficients of the $6n\pm1$-th orders to the practically ignorable level. That is, it made is possible to reduce, with a simple configuration, harmonic winding coefficients to the practically ignorable level.

Therefore, it is possible to reduce the harmonic winding coefficients to the practically ignorable level, for example, approximately zero while simplifying the configuration. As a result, it is possible to improve the productivity of the rotary electric machine 1, greatly reduce torque pulsation components (e.g., a $6f$ component and a $18f$ component of torque pulsation), and reduce torque pulsation and vibration sound to the practically ignorable level.

In the first embodiment, in the stator 20 of the rotary electric machine 1, the total number of turns in the first slot 23a and the total number of turns in the second slot 23b are different from each other so as to reduce harmonic components of an induced voltage to zero. Consequently, it is made possible to reduce the harmonic winding coefficients of, for example, the fifth order, the seventh order, the seventeenth order, and the nineteenth order among the harmonic winding coefficients of the $6n\pm1$-th orders to the practically ignorable level.

In the first embodiment, when the number of poles is represented as P, the number of slots is represented as S, the number of phases of a power supply is represented as m, and the number of slots in each pole and each phase is represented as q=S/P/m, the number of slots q in each pole and each phase is 2i (i is an integer equal to or larger than 1), a ratio of the total number of turns in the first slot 23a and the total number of turns in the second slot 23b is $0.85\sqrt{(3)}$:2 to $1.15\sqrt{(3)}$:2, and the i first slots 23a and the i second slots 23b are alternately arranged. Consequently, it is made possible to set the total number of turns in the first slot 23a and the total number of turns in the second slot 23b different from each other to reduce the harmonic components of the induced voltage to zero.

Figure 7:
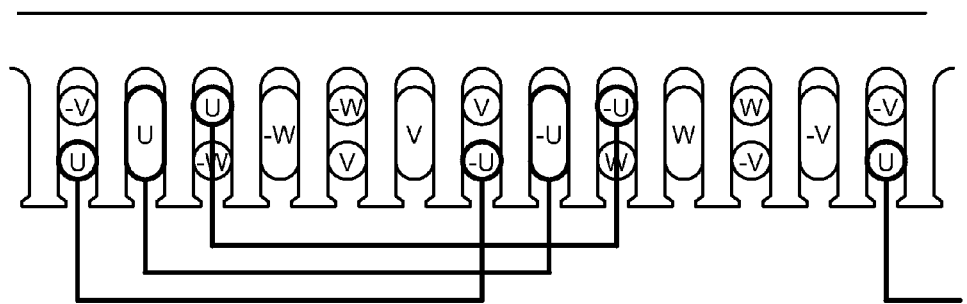
FIG. 7 is a diagram of connection of winding wires of the rotary electric machine according to the first embodiment.
Figure 8:
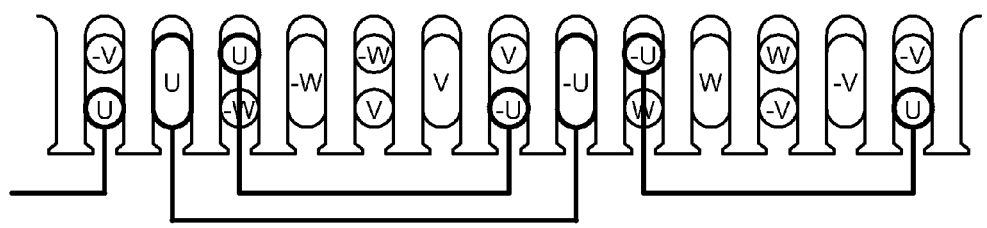
FIG. 8 is a diagram of connection of the winding wires of the rotary electric machine according to the first embodiment.

Note that, concerning the connection method for the winding wires, instead of the connection method shown in FIG. 2, a connection method shown in FIG. 7 or FIG. 8 can be adopted. In the first embodiment, it is explained that the connection method for the winding wires does not affect the winding coefficient. However, the connection method for the winding wires affects line length, that is, the resistance and the productivity of the winding wires. Diagrams of connection methods for U-phase winding wires according to the present invention are shown in FIG. 7 and FIG. 8. FIG. 7 illustratively shows the connection method for the U-phase winding wires that are lap-wound. FIG. 8 illustratively shows the connection method for the U-phase winding wires that are coaxially wound and distributedly wound. The idea of the first embodiment is also applicable to the connection method shown in FIG. 7 or FIG. 8.

That is, in the first slots 23a, instead of the winding wires of the same phase, as shown in FIG. 7 or FIG. 8, a winding wire of one phase can be arranged. In this case, it is possible to further simplify the configuration of the winding wires in the first slots 23a and further improve the productivity of the rotary electric machine 1.

Second Embodiment

A rotary electric machine 1i according to a second embodiment is explained. In the following explanation, differences from the first embodiment are mainly explained.

In the first embodiment, the number of turns and the like of the winding wires is contrived to attain simplification of the winding configuration. In the second embodiment, the arrangement of the winding wires is contrived to attain further simplification of the winding configuration.

Figure 9:
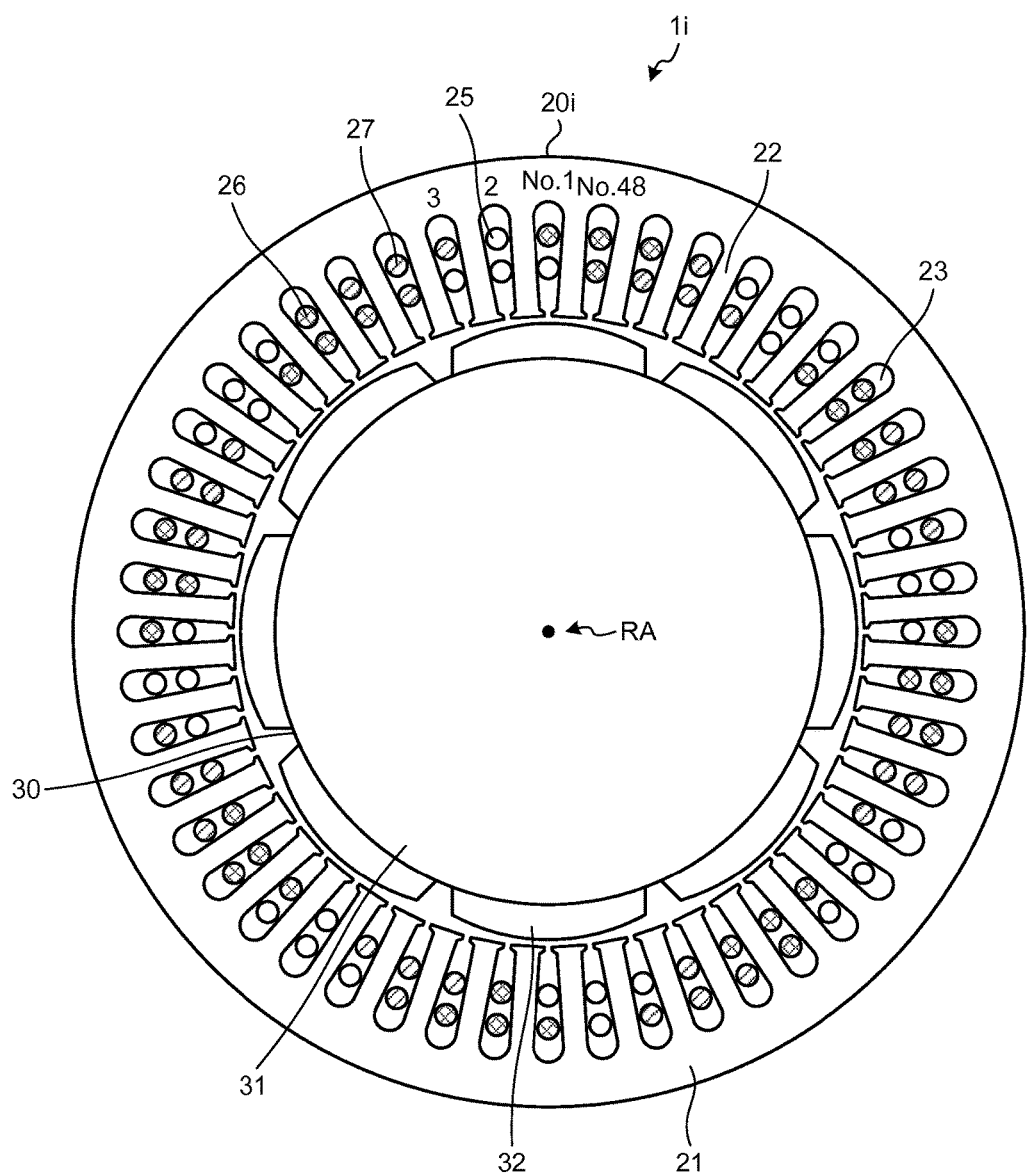
FIG. 9 is a diagram of a sectional view of a rotary electric machine according to a second embodiment.
Figure 10:
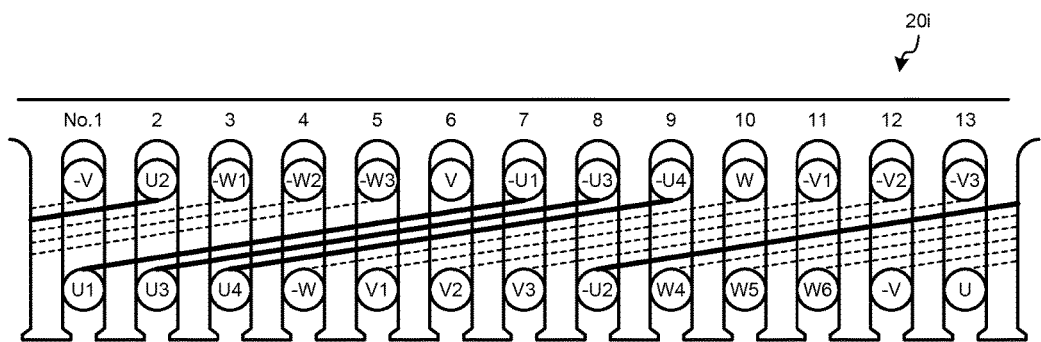
FIG. 10 is a diagram of a coil arrangement in each slot according to the second embodiment.

Specifically, the rotary electric machine 1i includes a configuration shown in FIG. 9 to FIG. 11. FIG. 9 is a diagram of the configuration of a cross section perpendicular to the rotation axis RA in the rotary electric machine 1i. FIG. 10 is a schematic diagram of coil arrangements in each slot. FIG. 11 is a diagram of allocation of phases and turn ratios of winding wires in each slot. In FIG. 9 to FIG. 11, for example, as the rotary electric machine 1i, a rotary electric machine in which the number of poles is eight, the number of slots is forty-eight, the number of phases is three, and the number of slots q in each pole and each phase is two is illustratively shown.

As shown in FIG. 9, in a stator 20i of the rotary electric machine 1i, for example, as opposed to the stator 20 (see FIG. 2) in the first embodiment, upper and lower winding wires in predetermined slots 23 are interchanged such that the winding wires in the same phase are arranged side by side in the lateral direction in the slots 23 adjacent to each other.

For example, as opposed to the stator 20 (see FIG. 2) in the first embodiment, when the winding wire of the U phase and the winding wire of the W phase in the slot number No. 3 are interchanged, as shown in FIG. 10, winding wires U1, U3, and U4 of the U phase are arranged side by side in the lateral direction on the lower side in the slot numbers No. 1 to No. 3. Winding wires -W1, -W2, and -W3 of the W phase are arranged side by side in the lateral direction on the upper side in the slot numbers No. 3 to No. 5.

For example, as opposed to the stator 20 (see FIG. 2) in the first embodiment, when the winding wire of the V phase and the winding wire of the U phase in the slot number No. 7 are interchanged, as shown in FIG. 10, winding wires V1, V2, and V3 of the V phase are arranged side by side in the lateral direction on the lower side in the slot numbers No. 5 to No. 7. Winding wires -U1, -U3, and -U4 of the U phase are arranged side by side in the lateral direction on the upper side in the slot numbers No. 7 to No. 9.

For example, as opposed to the stator 20 (see FIG. 2) in the first embodiment, when the winding wire of the W phase and the winding wire of the V phase in the slot number No. 11 are interchanged, as shown in FIG. 10, winding wires W4, W5, and W6 of the W phase are arranged side by side in the lateral direction on the lower side in the slot numbers No. 9 to No. 11. Winding wires -V1, -V2, and -V3 of the V phase are arranged side by side in the lateral direction on the upper side in the slot numbers No. 11 to No. 13.

Note that turn ratios are the same as those in the first embodiment (see FIG. 3) as shown in FIG. 11.

In this way, in the second embodiment, the upper and lower winding wires in the slots 23 are interchanged such that the winding wires in the same phase are arranged side by side in the lateral direction in the adjacent slots 23. Consequently, it is made possible to further simplify the winding configuration and attain further improvement of productivity and a reduction in winding resistance.

In the second embodiment, it is possible to increase the number of the winding wires of the same phase arranged side by side in the lateral direction. Therefore, it is made possible to reduce interference between the winding wires and reduce (e.g., minimize) the size of the end portions of the winding wires, that is, the resistance of the winding wires.

Third Embodiment

A rotary electric machine 1j according to a third embodiment is explained. In the following explanation, differences from the first embodiment are mainly explained.

In the first embodiment, the 6f component and the 18f component of the torque pulsation are greatly reduced by reducing the fifth order, seventh order, seventeenth order, and nineteenth order components of the winding coefficient to approximately zero. In the third embodiment, the 12f component of the torque pulsation is also reduced for a further reduction in the torque pulsation.

Figure 12:
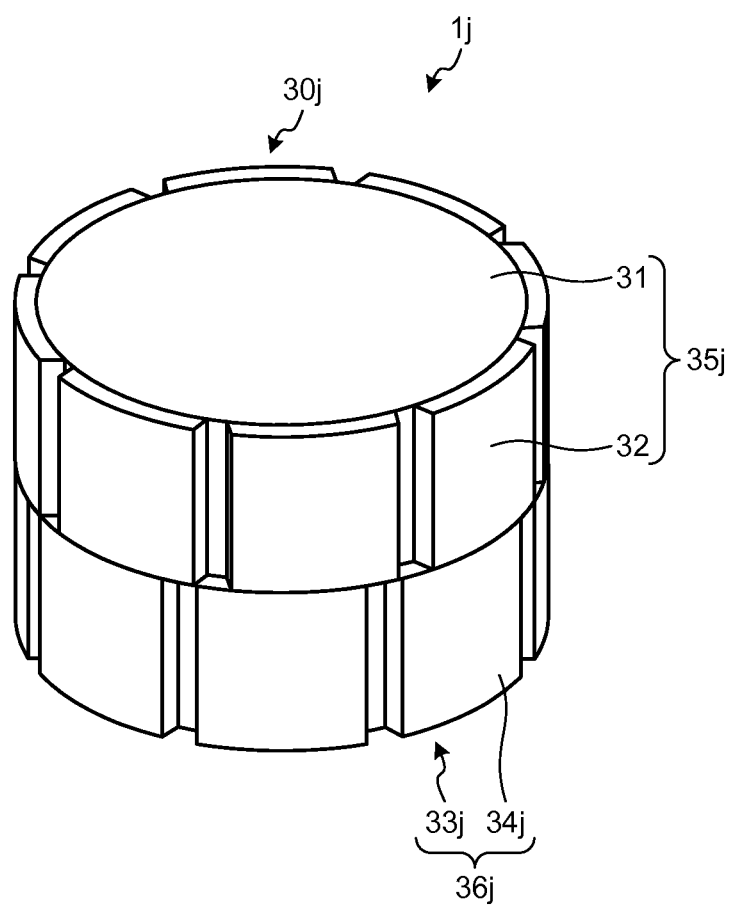
FIG. 12 is a perspective view of a rotary electric machine according to a third embodiment.
Figure 13:
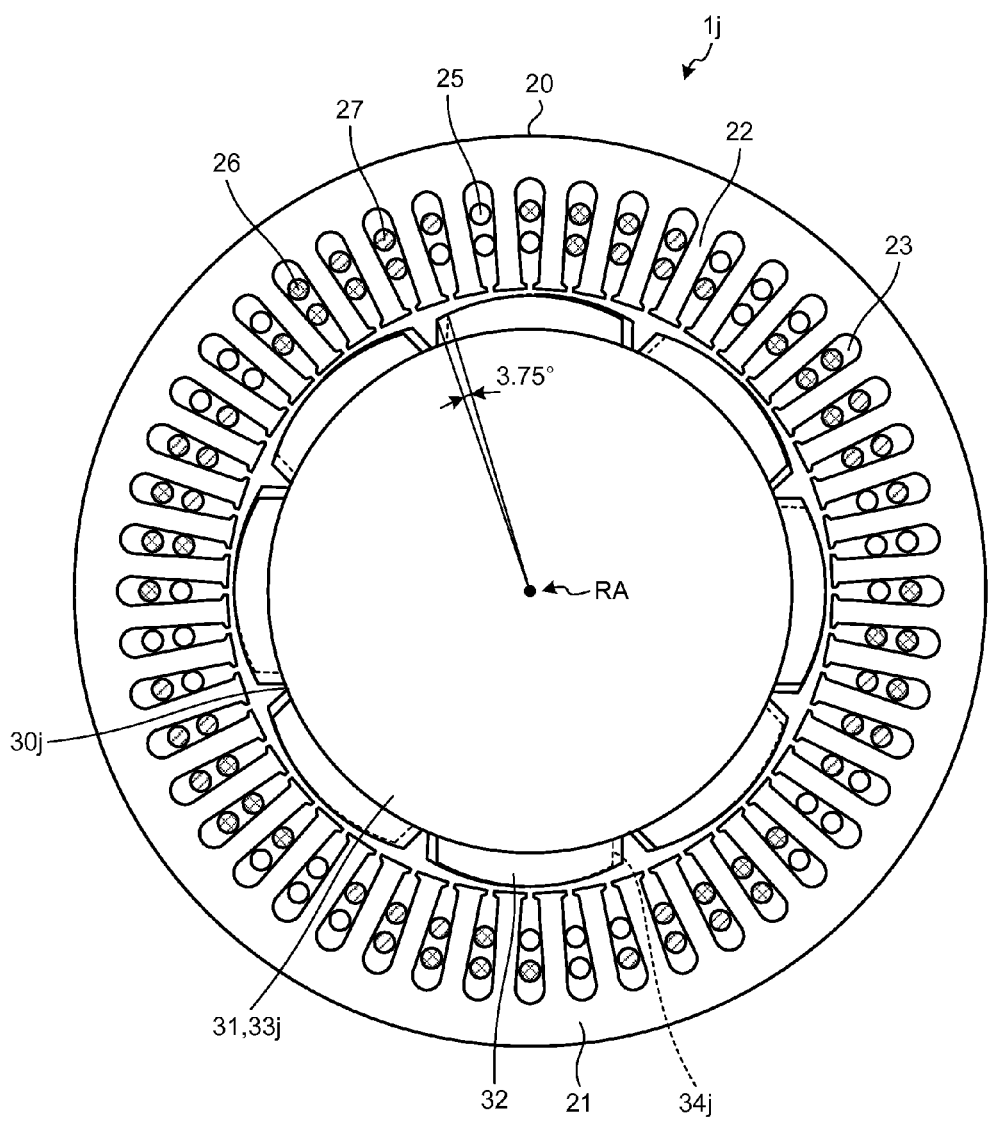
FIG. 13 is a sectional view of the rotary electric machine according to the third embodiment.

Specifically, the rotary electric machine 1j includes a configuration shown in FIGS. 12 and 13. FIG. 12 is a perspective view of the external configuration of a rotor 30j in the rotary electric machine 1j. FIG. 13 is a diagram of the configuration of a cross section perpendicular to the rotation axis RA in the rotary electric machine 1j.

In this embodiment, it is assumed that, in the rotor 30j, an upper stage 35j and a lower stage 36j are stacked in two stages in the rotation axis RA direction and a stage skew is performed in which the upper stage 35j has been rotated by θ1 in the circumferential direction with respect to the lower stage 36j.

For example, the rotor core 31 of the upper stage 35j and a rotor core 33j of the lower stage 36j are formed in substantially the same shape when viewed on a cross section perpendicular to the rotation axis RA and are coupled to each other along the rotation axis RA. A plurality of permanent magnets 32 are arranged along the circumferential surface of the rotor core 31. A plurality of permanent magnets 34j are arranged along the circumferential surface of the rotor core 33j. In this case, when viewed on the cross section perpendicular to the rotation axis RA, the arranged positions of the permanent magnets 32 and the arranged positions of the permanent magnets 34j are shifted by being rotated at an angle of θ1 in the circumferential direction around the rotation axis RA (stage skew). The circumferential rotation angle θ1 is determined by, for example, the following Formula (12):

$$\theta1 = 360/(12 \times \text{number of poles}/2)/2 \quad (12)$$
$$= 360/(12 \times 8/2)/2 = 3.75°$$

With this stage skew, it is also possible to greatly reduce the 12f component of the torque pulsation. It is possible to reduce substantially all the components of the torque pulsation.

Note that, in this embodiment, the stage skew of the rotor is explained. However, the same effects can be obtained by performing the stage skew of a stator.

In a linear skew of the rotor and the stator, the same effects can be obtained by applying skew at an angle θ2 calculated by the following Formula (13):

$$\theta2 = 360/(12 \times \text{number of poles}/2) \quad (13)$$

In this way, in the third embodiment, the stage skew is provided in the rotor 30j (or the stator). Therefore, in addition to effects same as the effects in the first embodiment, it is possible to further reduce, for example, the 12f component of the torque pulsation and more greatly reduce the torque pulsation components.

Fourth Embodiment

A rotary electric machine 1k according to a fourth embodiment is explained. In the following explanation, differences from the first embodiment are mainly explained.

In the first embodiment, the rotary electric machine 1 in which the number of slots q in each pole and each phase is two is illustratively explained. In the fourth embodiment, a case in which the number of slots q in each pole and each phase is four is illustratively explained.

Figure 14:
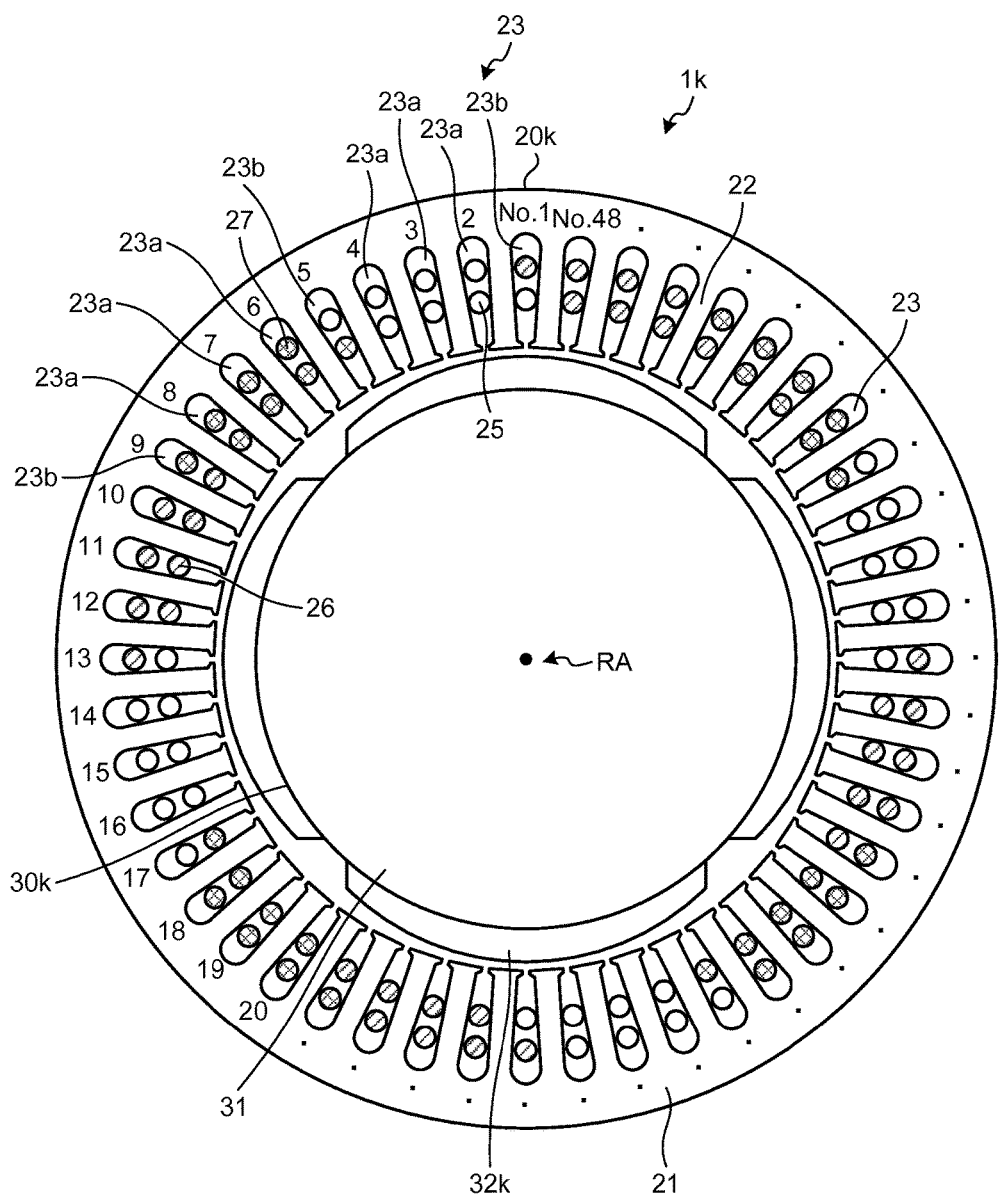
FIG. 14 is a diagram of a sectional view of a rotary electric machine according to a fourth embodiment.

Specifically, the rotary electric machine 1k includes a configuration shown in FIG. 14 and FIG. 15. FIG. 14 is a diagram of the configuration of a cross section perpendicular to the rotation axis RA in the rotary electric machine 1k. FIG. 15 is a diagram of allocation of phases of winding wires and turn ratios in each slot. In FIG. 14 and FIG. 15, a rotary electric machine in which the number of poles is four, the number of slots is forty-eight, the number of phases is three, and the number of slots q in each pole and each phase is four is illustratively shown.

As shown in FIG. 14, in this embodiment, in the rotary electric machine 1k, the number of a plurality of permanent magnets 32k arranged on the circumferential surface of a rotor 30k is small compared with the number in the first embodiment. In other words, the number of the slots 23 opposed to one permanent magnet 32k is large compared with the number in the first embodiment.

In FIG. 14 and FIG. 15, in a stator 20k of the rotary electric machine 1k, two winding wires of different phases or the same phase are arranged in one slot 23.

For example, a winding wire of the V phase and a winding wire of the U phase are arranged in the slot 23 (the second slot 23b) in the slot number No. 1. Two winding wires of the U phase are arranged in each of the slots 23 (the first slots 23a) in the slot numbers No. 2 to No. 4. A winding wire of the W phase and a winding wire of the U phase are arranged in the slot 23 (the second slot 23b) in the slot number No. 5. Two winding wires of the W phase are arranged in each of the slots 23 (the first slots 23a) in the slot numbers No. 6 to No. 8. A winding wire of the V phase and a winding wire of the W phase are arranged in the slot 23 (the second slot 23b) in the slot number No. 9.

Concerning the slot numbers No. 1 to No. 48 along the stator core 21, when the number of slots q in each pole and each phase is j (j is an integer equal to or lager than 2), j−1 first slots 23a and one second slot 23b are alternately arranged. For example, in the case shown in FIG. 14, because j=4, three first slots 23a and one of the second slot 23b are alternately arranged. That is, the three first slots 23a and one of the second slot 23b are respectively arranged at a cycle of four slot numbers. Pitches of arrangement of the first slots 23a and the second slot 23b shift from each other by two slots.

Further, the number of turns of the phases arranged in each of slots 23 is set to be different in the first slot 23a in which the winding wires of the same phase are arranged and the second slot 23b in which the winding wires of different phases are arranged. Two kinds of number of turns are used in total.

In this embodiment, when the number of turns of the U-phase winding wires arranged in the slot numbers No. 1 to No. 3 is represented as U1 (No. 1 lower), U2 to 7 (No. 2 to No. 4 upper and lower), and U8 (No. 5 upper), a turn ratio is configured as indicated by the following Formula (14).

$$U1:U2:U3:U4:U5:U6:U7:U8=1:0.9294:0.9294:0.9294:0.9294:0.9294:0.9294:1 \quad (14)$$

In Formula (14), 0.9294 can be regarded as being approximately 0.93.

To examine a winding coefficient reduction by changing the number of turns, as in the first embodiment, vector diagrams of induced voltage generated in the #1 winding wire to the #8 winding wire are used. In FIGS. 16(a) to 16(f), vector diagrams of induced voltage harmonic components of a fifth order, a seventh order, an eleventh order, a thirteenth order, a seventeenth order, and a nineteenth order generated in the #1 winding wire to the #8 winding wire are respectively shown.

First, this embodiment aims at reducing eleventh order and thirteenth order components of a winding coefficient. When focusing on a vector diagram of the eleventh order (FIG. 16(c)), a phase difference between the #1 winding wire and the #2 winding wire is 180×4/48×11=165° and a phase difference between the #1 winding wire and the #4 winding wire is 330° (=−30°). When the number of turns of the #1 winding wire and the #8 winding wire is represented as A and the number of turns of the #2 winding wire to the #7 winding wire is represented as B, a distributed winding coefficient of the eleventh order and the thirteenth order is as indicated by the following Formula (15).

$$Kd=(2B+2A\times\cos 30°-4B\times\cos 15°)/(2A+6B) \quad (15)$$

Therefore, if B={cos 30°/(2 cos 15°−1)}A=0.9294 A, Formula (15) is zero.

Note that, in the above explanation, the distributed winding coefficient of the eleventh order and the thirteenth order is set to zero. However, a distributed winding coefficient of the fifth order and the nineteenth order and a distributed winding coefficient of the seventh order and the seventeenth order can also be set to zero.

For example, when the number of turns of the #1 winding wire and the #8 winding wire is represented as A and the number of turns of the #2 winding wire to the #7 winding wire is represented as B, the distributed winding coefficient of the fifth order and the nineteenth order is as indicated by the following Formula (16).

$$Kd=)(2A\times\cos 30°-2B-4B\times\cos 75°/(2A+6B) \quad (16)$$

Therefore, if B={cos 30°/(1+2 cos 75°)}A=0.5706 A, Formula (16) is zero.

The distributed winding coefficient of the seventh order and the seventeenth order is as indicated by the following Formula (17).

$$Kd=(2A\times\cos 30°+4B\times\cos 75°-2B)/(2A+6B) \quad (17)$$

Therefore, if B={cos 30°/(1−2 cos 75°)}A=1.795 A, Formula (17) is zero.

The winding coefficients calculated as explained above are shown in FIGS. 17(a) to 17(c). It is seen from FIGS. 17(a) to 17(c) that harmonic components can be reduced by changing a turn ratio. As to which of the configurations of the number of turns shown in FIGS. 17(a) to 17(c) should be adopted, it can be determined, for example, according to harmonic components contained in the rotor.

In this way, in the fourth embodiment, in the stator 20k of the rotary electric machine 1k, the number of slots q in each pole and each phase is j (j is an integer equal to or larger than 2) and j−1 first slots 23a and one second slot 23b are alternately arranged. Consequently, in rotary electric machines in which q is other than 2i as well, it is made possible to reduce specific harmonic components to approximately zero.

For example, in the fourth embodiment, in the stator 20k of the rotary electric machine 1k, the number of slots q in each pole and each phase is four and a ratio of a total number of turns in the first slot 23a and a total number of turns in the second slot 23b is approximately 0.93:1. Consequently, as shown in FIG. 17(a), for example, it is made possible to reduce harmonic components of the eleventh order and the thirteenth order to approximately zero. That is, it is made possible to reduce second harmonic components (twelfth f components) of the torque pulsation to approximately zero in the rotary electric machine 1k with q=4.

Alternatively, for example, in the fourth embodiment, in the stator 20k of the rotary electric machine 1k, the number of slots q in each pole and each phase is four and the ratio of the total number of turns in the first slot 23a and the total number of turns in the second slot 23b is approximately 0.57:1. Consequently, as shown in FIG. 17(b), for example, it is possible to reduce harmonic components of the fifth order and the nineteenth order to approximately zero.

Alternatively, for example, in the fourth embodiment, in the stator 20k of the rotary electric machine 1k, the number of slots q in each pole and each phase is four and the ratio of the total number of turns in the first slot 23a and the total number of turns in the second slot 23b is approximately 1.80:1. Consequently, as shown in FIG. 17(c), for example, it is possible to reduce harmonic components of the seventh order and the seventeenth order to approximately zero.

Fifth Embodiment

A rotary electric machine 1n according to a fifth embodiment is explained. In the following explanation, differences from the forth embodiment are mainly explained.

In the fourth embodiment, the number of turns and the like of the winding wires is contrived to attain simplification of the winding configuration. In the fifth embodiment, the arrangement of the winding wires is contrived to attain further simplification of the winding configuration.

Figure 18:
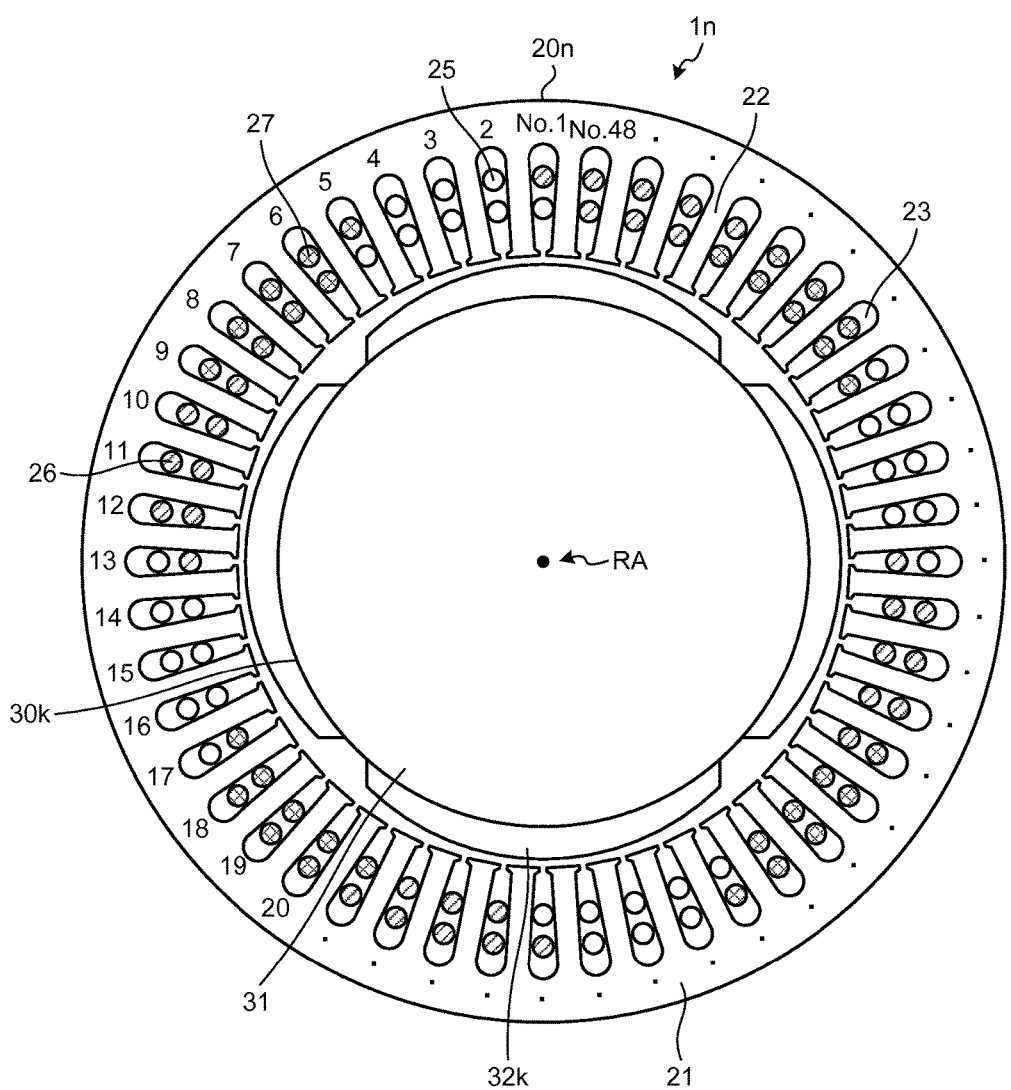
FIG. 18 is a diagram of a sectional view of a rotary electric machine according to a fifth embodiment.
Figure 19:
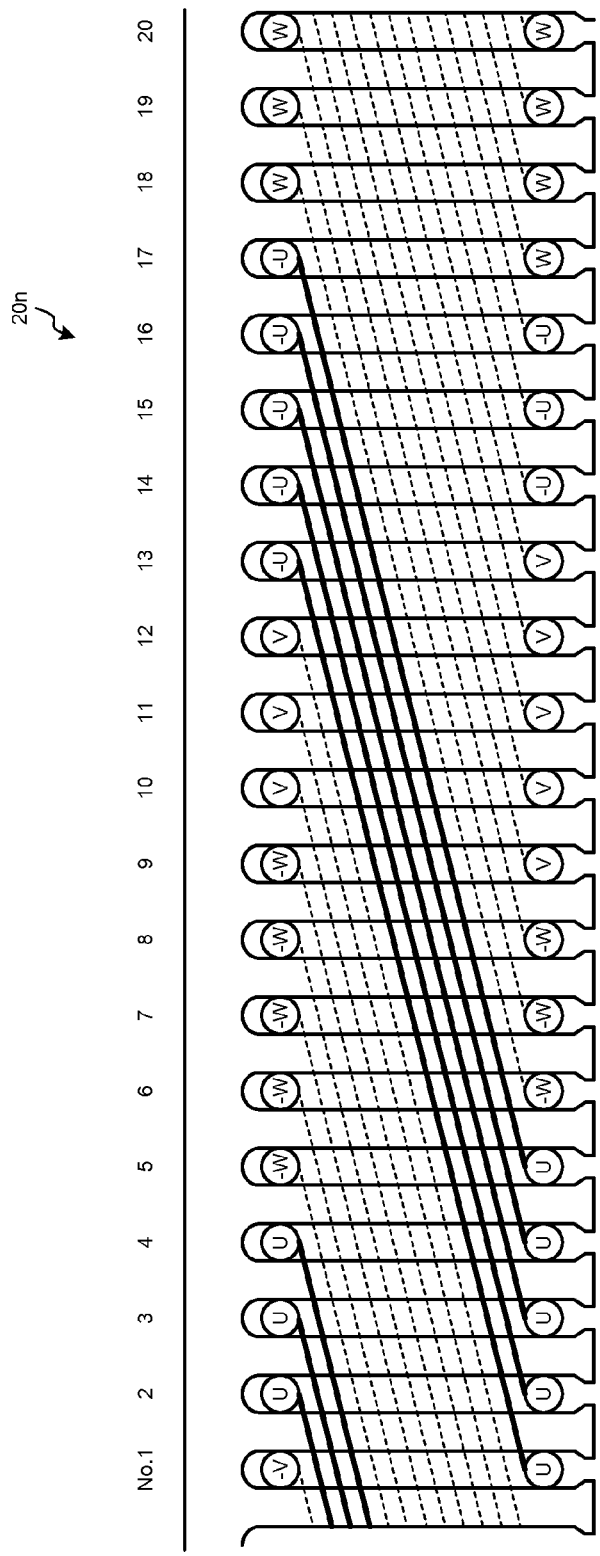
FIG. 19 is a diagram of connection of winding wires of the rotary electric machine according to the fifth embodiment.

Specifically, the rotary electric machine 1n includes a configuration shown in FIG. 18 to FIG. 20. FIG. 18 is a diagram of the configuration of a cross section perpendicular to the rotation axis RA in the rotary electric machine 1n. FIG. 19 is a schematic diagram of coil arrangements in each slot. FIG. 20 is a diagram of allocation of phases and turn ratios of winding wires in each slot. In FIG. 18 to FIG. 20, for example, as the rotary electric machine 1n, a rotary electric machine in which the number of poles is four, the number of slots is forty-eight, the number of phases is three, and the number of slots q in each pole and each phase is four is illustratively shown.

As shown in FIG. 18, in a stator 20n of the rotary electric machine 1n, for example, as opposed to the stator 20k (see FIG. 14) in the fourth embodiment, upper and lower winding wires in predetermined slots 23 are interchanged such that the winding wires in the same phase are arranged side by side in the lateral direction in the slots 23 adjacent to each other.

For example, as opposed to the stator 20k (see FIG. 14) in the fourth embodiment, when the winding wire of the U phase and the winding wire of the W phase in the slot number No. 5 are interchanged, as shown in FIG. 19, five winding wires of the U phase are arranged side by side in the lateral direction on the lower side in the slot numbers No. 1 to No. 5. Five winding wires of the W phase are arranged side by side in the lateral direction on the upper side in the slot numbers No. 5 to No. 9.

For example, as opposed to the stator 20k (see FIG. 14) in the fourth embodiment, when the winding wire of the V phase and the winding wire of the U phase in the slot number No. 13 are interchanged, as shown in FIG. 19, five winding wires of the V phase are arranged side by side in the lateral direction on the lower side in the slot numbers No. 9 to No. 13. Five winding wires of the U phase are arranged side by side in the lateral direction on the upper side in the slot numbers No. 13 to No. 17.

Note that turn ratios are the same as the turn ratios in the fourth embodiment (see FIG. 15).

In this way, in the fifth embodiment, the upper and lower winding wires in the slots 23 are interchanged such that the winding wires in the same phase are arranged side by side in the lateral direction in the adjacent slots 23. Consequently, it is possible to further simplify the winding configuration and attain further improvement of productivity and a reduction in winding resistance.

In the fifth embodiment, it is possible to increase the number of the winding wires of the same phase arranged side by side in the lateral direction. Therefore, it is made possible to reduce interference between the winding wires and reduce (e.g., minimize) the size of the end portions of the winding wires, that is, the resistance of the winding wires.

Sixth Embodiment

A rotary electric machine 1p according to a sixth embodiment is explained. In the following explanation, differences from the first embodiment are mainly explained.

In the first embodiment, the rotary electric machine 1 in which the number of slots q in each pole and each phase is two is illustratively explained. In the sixth embodiment, in a case in which the number of slots q in each pole and each phase is three is illustratively explained.

Specifically, a stator 20p of the rotary electric machine 1p includes a configuration shown in FIG. 20. FIG. 20 is a diagram of allocation of phases of winding wires and turn ratios in each slot. In FIG. 20, a rotary electric machine in which the number of poles is four, the number of slots is thirty-six, the number of phases is three, and the number of slots q in each pole and each phase is three is illustratively shown.

As shown in FIG. 20, concerning the slot numbers No. 1 to No. 48 along the stator core 21, when the number of slots q in each pole and each phase is j (j is an integer equal to or lager than 2), j−1 first slots 23a and one second slot 23b are alternately arranged. For example, in the case shown in FIG. 20, because j=3, two first slots 23a and one second slots 23b are alternately arranged. That is, the two first slots 23a and the one second slot 23b are respectively arranged at a cycle of three slot numbers. Pitches of arrangement of the first slots 23a and the second slot 23b shift from each other by 1.5 slots.

In FIG. 20, taking into account symmetry of the winding wires, the winding wires of the slots 23 in the slot numbers No. 1 to No. 18 are shown. As shown in FIG. 20, a ratio of a total number of turns in the first slot 23a and a total number of turns in the second slot 23b is approximately 0.67:1. Note that 0.6736 in FIG. 20 can be regarded as being approximately 0.67.

To examine a winding coefficient reduction by changing the number of turns, as in the first embodiment, vector diagrams of induced voltages generated in the #1 winding wire to the #6 winding wire are used. In FIGS. 21(a) to 21(f), vector diagrams of induced voltage harmonic components of a fifth order, a seventh order, an eleventh order, a thirteenth order, a seventeenth order, and a nineteenth order generated in the #1 winding wire to the #6 winding wire are respectively shown. First, this embodiment aims at reducing fifth order and thirteenth order components of a winding coefficient.

When focusing on a vector diagram of the fifth order (FIG. 21(a)), a phase difference between the #1 winding wire and the #2 winding wire is 180×4/36×5=100° and a phase difference between the #1 winding wire and the #6 winding wire is 300° (=−60°). When the number of turns of the #1 winding wire and the #6 winding wire is represented as A and the number of turns of the #2 winding wire to the #5 winding wire is represented as B, the distributed winding coefficient Kd of the fifth order and the thirteenth order is as indicated by the following Formula (18).

(18)    $Kd = (2A \times \cos 30° - 4B \times \cos 50°/(2A+4B)$

Therefore, if B={cos 30°/(2 cos 50°)}A=0.6736 A, Formula (18) is zero.

Similarly, a distributed winding coefficient of the seventh order and the eleventh order is as indicated by the following Formula (19).

$$Kd=)(2A\times\cos 30°-4B\times\cos 70°/(2A+4B) \quad (19)$$

Therefore, if B={cos 30°/(2 cos 70°)}A=1.266 A, Formula (19) is zero.

The winding coefficients calculated in this way are shown in FIGS. 22(a) and 22(b). It is seen from FIGS. 22(a) and 22(b) that harmonic components can be reduced by changing a turn ratio. As to which of the configurations of the numbers of turns shown in FIGS. 22(a) and 22(b) should be adopted can be determined, for example, according to harmonic components contained in the rotor.

In this way, in the sixth embodiment, in the stator $20p$ of the rotary electric machine $1p$, the number of slots q in each pole and each phase is j (j is an integer equal to or larger than 2) and j−1 first slots 23a and one second slot 23b are alternately arranged. Consequently, in rotary electric machines in which q is other than 2i, it is also possible to reduce specific harmonic components to approximately zero.

For example, in the sixth embodiment, in the stator $20p$ of the rotary electric machine $1p$, the number of slots q in each pole and each phase is three and a ratio of a total number of turns in the first slot 23a and a total number of turns in the second slot 23b is approximately 0.67:1. Consequently, as shown in FIG. 22(a), for example, it is made possible to reduce harmonic components of the fifth order and the thirteenth order to approximately zero.

Alternatively, for example, in the sixth embodiment, in the stator $20p$ of the rotary electric machine $1p$, the number of slots q in each pole and each phase is three and the ratio of the total number of turns in the first slot 23a and the total number of turns in the second slot 23b is approximately 1.27:1. Consequently, as shown in FIG. 22(b), it is possible to reduce harmonic components of the seventh order and the eleventh order to approximately zero.

Seventh Embodiment

A rotary electric machine $1q$ according to a seventh embodiment is explained. In the following explanation, differences from the first embodiment are mainly explained.

In the first embodiment, the rotary electric machine 1 in which the number of slots q in each pole and each phase is two is illustratively explained. In the seventh embodiment, the rotary electric machine $1q$ in which the number of slots q in each pole and each phase is six is illustratively explained.

Specifically, a stator $20q$ of the rotary electric machine $1q$ includes a configuration shown in FIG. 23. FIG. 23 is a diagram of allocation of phases of winding wires and turn ratios in each slot. In FIG. 23, a rotary electric machine in which the number of poles is four, the number of slots is seventy-two, the number of phases is three, and the number of slots q in each pole and each phase is six is illustratively shown.

As shown in FIG. 23, concerning the slot numbers No. 1 to No. 72 along the stator core 21, when the number of slots q in each pole and each phase is j (j is an integer equal to or lager than 2), j−1 first slots 23a and one second slot 23b are alternately arranged. For example, in the case shown in FIG. 23, because j=6, five first slots 23a and one second slots 23b are alternately arranged. That is, the five first slots 23a and the one second slot 23b are respectively arranged at a cycle of six slot numbers. Pitches of arrangement of the first slots 23a and the second slot 23b shift from each other by three slots.

In FIG. 23, taking into account symmetry of the winding wires, the slots in the slot numbers No. 1 to No. 36 are shown. As shown in FIG. 23, a ratio of a total number of turns in the first slot 23a and a total number of turns in the second slot 23b is approximately 0.96:1. Note that 0.9519 in FIG. 23 can be regarded as being approximately 0.96.

To examine a winding coefficient reduction by changing the number of turns, as in the first embodiment, vector diagrams of induced voltages generated in the #1 winding wire to the #12 winding wire are used. In FIGS. 24(a) to 24(f), vector diagrams of induced voltage harmonic components of a fifth order, a seventh order, an eleventh order, a thirteenth order, a seventeenth order, and a nineteenth order generated in the #1 winding wire to the #12 winding wire are respectively shown. First, this embodiment aims at reducing seventeenth order and nineteenth order components of a winding coefficient.

When focusing on a vector diagram of the seventeenth order (FIG. 24(e)), a phase difference between the #1 winding wire and the #2 winding wire is 180×4/72×17=170° and a phase difference between the #1 winding wire and the #4 winding wire is 340° (=−20°). When the number of turns of the #1 winding wire and the #12 winding wire is represented as A and the number of turns of the #2 winding wire to the #11 winding wire is represented as B, the distributed winding coefficient Kd of the seventeenth order and the nineteenth order is as indicated by the following Formula (20).

$$Kd=(2A\times\cos 30°+4B\times\cos 10°-2B-4B\times\cos 20°/(2A+10B) \quad (20)$$

Therefore, if B={cos 30°/(1+2 cos 20°−2 cos 10°)}A=0.9519 A, Formula (20) is zero.

The distributed winding coefficient Kd of the fifth order is as indicated by the following Formula (21).

$$Kd=)(2A\times\cos 30°+4B\times\cos 80°-2B-4B\times\cos 50°/(2A+10B) \quad (21)$$

Therefore, if B={cos 30°/(1+2 cos 50°−2 cos 80°)}A=0.4468 A, Formula (21) is zero.

The winding coefficients calculated in this way are shown in FIGS. 25(a) and 25(b). Note that, concerning the seventh order, the eleventh order, and the thirteenth order, it is also possible to calculate a turn ratio for reducing the winding coefficients to zero by using the vector diagrams of FIG. 24.

In this way, in the seventh embodiment, in the stator $20q$ of the rotary electric machine $1q$, the number of slots q in each pole and each phase is j (j is an integer equal to or larger than 2) and j−1 first slots 23a and one second slot 23b are alternately arranged. Consequently, in rotary electric machines in which q is other than 2i, it is also possible to reduce specific harmonic components to approximately zero.

For example, in the seventh embodiment, in the stator $20q$ of the rotary electric machine $1q$, the number of slots q in each pole and each phase is six and a ratio of a total number of turns in the first slot 23a and a total number of turns in the second slot 23b is approximately 0.96:1. Consequently, as shown in FIG. 25(a), it is possible to reduce harmonic components of the seventeenth order and the nineteenth order to approximately zero.

Alternatively, for example, in the seventh embodiment, in the stator $20q$ of the rotary electric machine $1q$, the number of slots q in each pole and each phase is six and the ratio of the total number of turns in the first slot 23a and the total number of turns in the second slot 23b is approximately 0.45:1. Consequently, as shown in FIG. 25(b), it is possible to reduce harmonic components of the fifth order to approximately zero.

Eighth Embodiment

A rotary electric machine 1r according to an eighth embodiment is explained. In the following explanation, differences from the fourth embodiment are mainly explained.

In the fourth embodiment, the numbers of alternately-arranged first slots 23a and that of second slots 23b are set different from each other. In the eighth embodiment, the number of alternately-arranged first slots 23a and that of second slots 23b are set the same.

Figure 26:
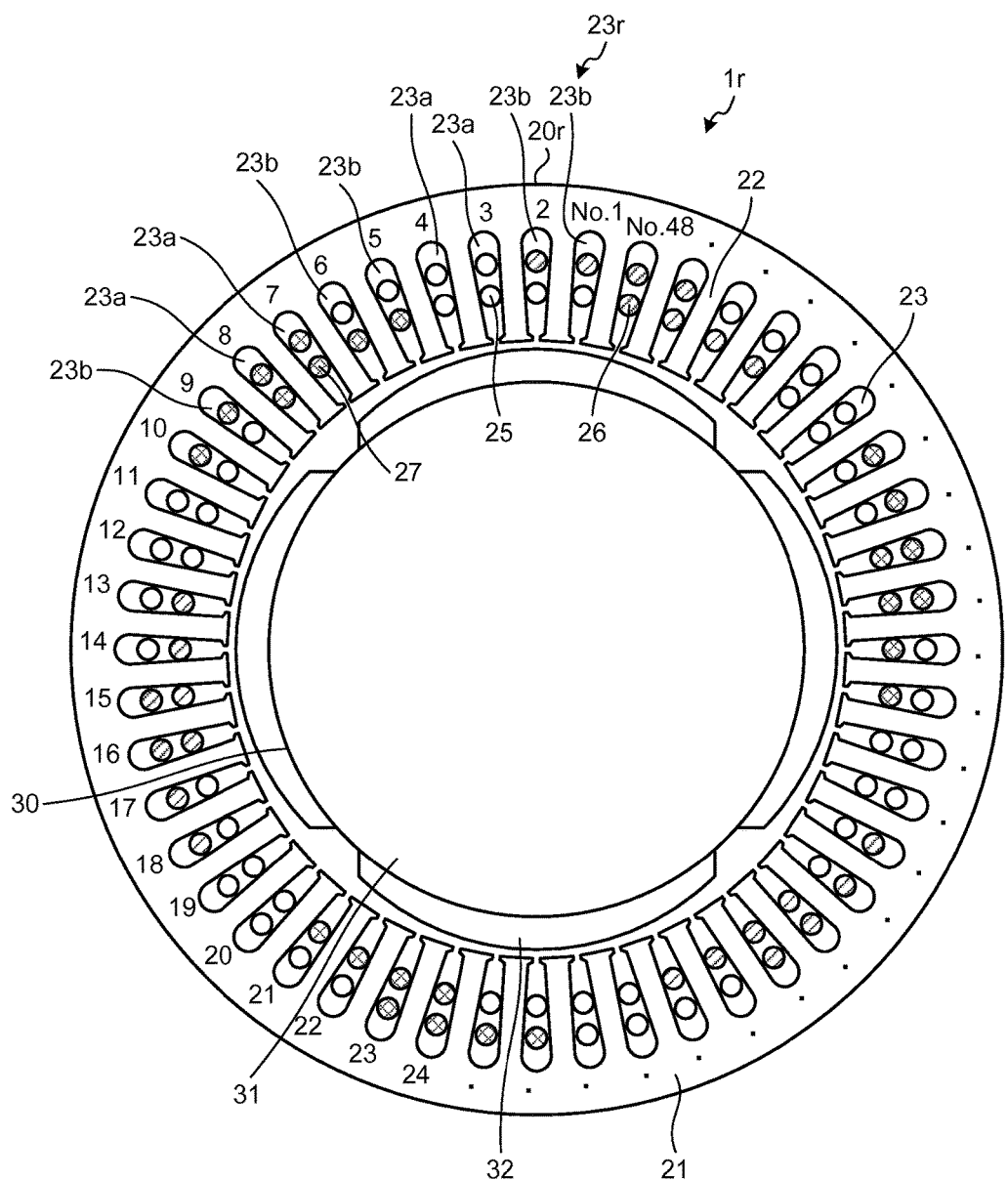
FIG. 26 is a diagram of a sectional view of a rotary electric machine according to an eighth embodiment.

Specifically, the rotary electric machine 1r includes a configuration shown in FIG. 26 and FIG. 27. FIG. 26 is a diagram of the configuration of a cross section perpendicular to the rotation axis RA in the rotary electric machine 1r. FIG. 27 is a diagram of allocation of phases of winding wires and turn ratios in each slot. In FIG. 26 and FIG. 27, a rotary electric machine in which the number of poles is four, the number of slots is forty-eight, the number of phases is three, and the number of slots q in each pole and each phase is four is illustratively shown.

As shown in FIG. 27, in this embodiment, in a stator 20r of the rotary electric machine 1r, the first slot 23a in which two winding wires of the same phase are arranged and the second slot 23b in which two winding wires of different phases are alternately arranged by the same number.

For example, winding wires of the V phase and winding wires of the U phase are arranged in the slots 23 (the second slots 23b) in the slot numbers No. 1 and No. 2. Two winding wires of the U phase are arranged in the slots 23 (the first slots 23a) in the slot numbers No. 3 and No. 4. A winding wire of the W phase and a winding wire of the U phase are arranged in the slots 23 (the second slots 23b) in the slot numbers No. 5 and No. 6.

Further, the number of turns of the phases arranged in the slots 23 is set to be different in the first slot 23a in which the winding wires of the same phase are arranged and the second slot 23b in which the winding wires of different phases are arranged. Two kinds of the numbers of turns are used in total.

In this embodiment, when the number of turns of the U-phase winding wires arranged in the slot numbers No. 1 to No. 6 are represented as U1 (No. 1 lower), U2 (No. 2 lower), U3 to 6 (No. 3 and No. 4 upper and lower), U7 (No. 5 upper), and U8 (No. 6 upper), a turn ratio is configured as indicated by the following Formula (22).

$$U1:U2:U3:U4:U5:U6:U7:U8=1:1:\sqrt{(3)}/2:\sqrt{(3)}/2:\sqrt{(3)}/2:\sqrt{(3)}/2:1:1 \quad (22)$$

To examine a winding coefficient reduction by changing the number of turns, as in the first embodiment, vector diagrams of induced voltages generated in the #1 winding wire to the #8 winding wire are used. In FIGS. 28(a) to 28(f), vector diagrams of induced voltage harmonic components of a fifth order, a seventh order, an eleventh order, a thirteenth order, a seventeenth order, and a nineteenth order generated in the #1 winding wire to the #8 winding wire are respectively shown.

Figure 5:
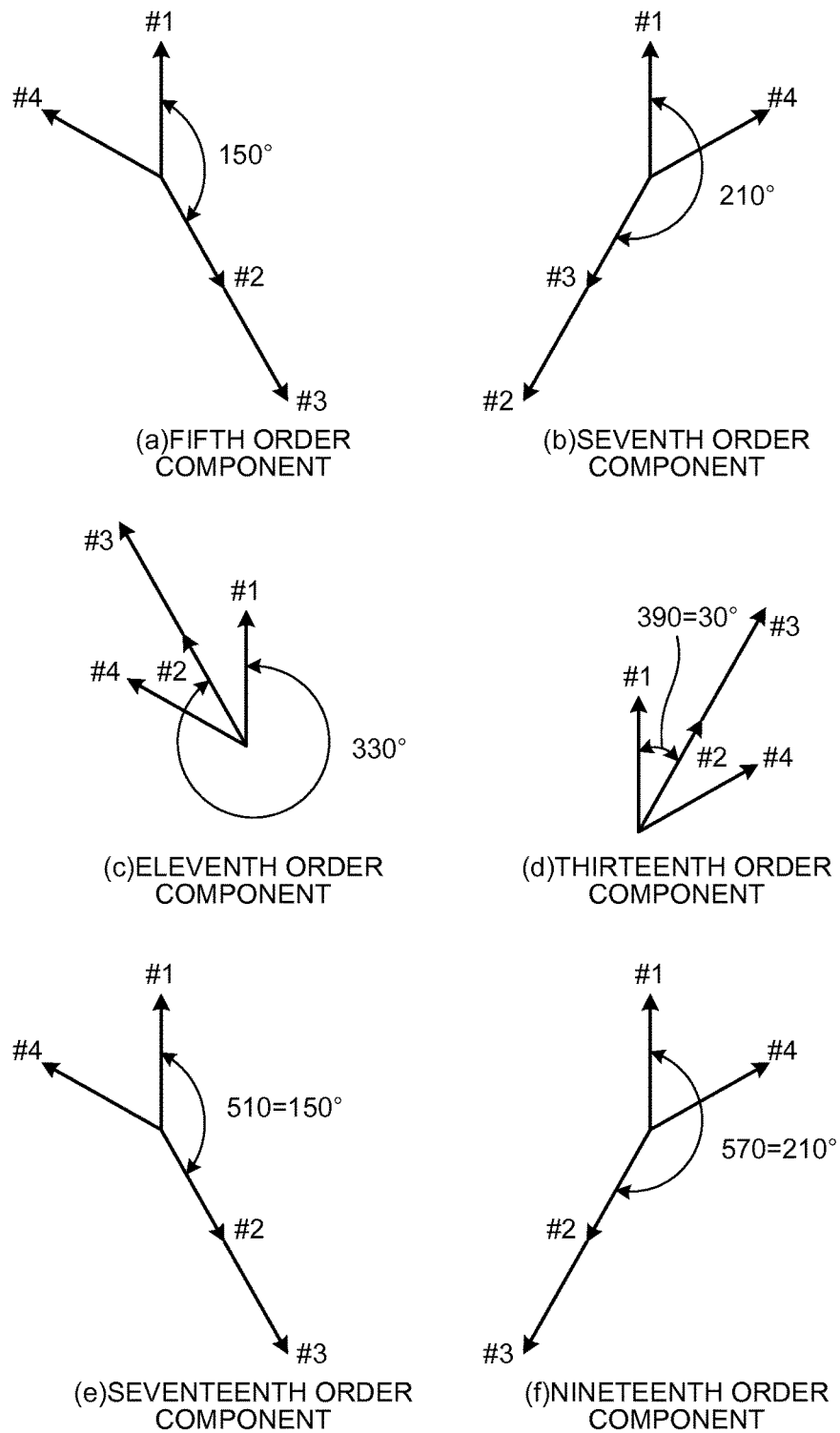
FIG. 5 is a vector diagram of a phase relation among harmonic components of the induced voltage of the #1 winding wire to the #4 winding wire according to the first embodiment.

Vector diagrams of the #1 winding wire—the #3 winding wire and the #4 winding wire—the #7 winding wire, and vector diagrams of the #2 winding wire—the #5 winding wire and the #6 winding wire—the #8 winding wire are respectively the same as the vector diagram of FIG. 5(a). Therefore, it is seen that a winding coefficient of the fifth order is reduced to zero by setting the turn ratio indicated by Formula (22) (see FIG. 27). Concerning the seventh order, the seventeenth order, and the nineteenth order, winding coefficients can be reduced to zero by setting the turn ratio indicated by Formula (22) as in FIG. 5.

Figures 29, 30:
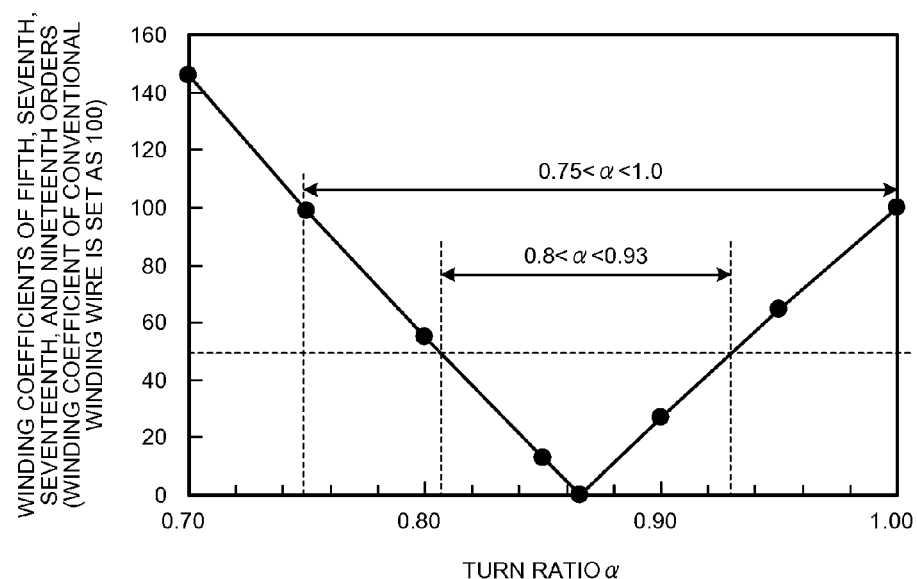
FIG. 29 is a diagram of winding coefficients of the rotary electric machine according to the eighth embodiment.
FIG. 30 is a diagram of turn ratios and winding coefficients of fifth, seventh, seventeenth, and nineteenth orders according to a ninth embodiment.

The winding coefficients calculated in this way are shown in FIG. 29. It is seen from FIG. 29 that, by adopting this winding arrangement, as in the case of q=2 in the first embodiment, it is possible to reduce the winding coefficients of the fifth order, the seventh order, the seventeenth order, and the nineteenth order to zero.

In this embodiment, an example is explained in which, in the case of q=4, two slots in which different-phase winding wires are arranged and two slots in which same-phase winding wires are arranged are alternately arranged. In the case of q=2i (i is an integer), under the same idea, if i slots in which different-phase winding wires are arranged and i slots in which same-phase winding wires are arranged are alternately arranged, it is possible to reduce the winding coefficients of the fifth order, seventh order, seventeenth order, and nineteenth order components to zero as in this embodiment.

As explained above, when the number of poles is represented as P, the number of slots is represented as S, the number of phases of a power supply is represented as m, and the number of slots in each pole and each phase is represented as q=S/P/m, the number of slots q in each pole and each phase is 2i (i is an integer equal to or larger than 1), a ratio of the total number of turns in the first slot 23a and the total number of turns in the second slot 23b is $0.85\sqrt{(3)}$:2 to $1.15\sqrt{(3)}$:2, and the i first slots 23a and the i second slots 23b are alternately arranged. Consequently, it is possible to set the total number of turns in the first slot 23a and the total number of turns in the second slot 23b different from each other to reduce the harmonic components of the induced voltage to zero.

Ninth Embodiment

A rotary electric machine according to a ninth embodiment is explained. In the following explanation, differences from the first to eighth embodiments are mainly explained.

In the first to eighth embodiments, the number of turns is different between the first slot 23a in which the winding wires of the same phase are arranged and the number of turns in the second slot 23b in which the winding wires of different phases are arranged, wherein two kinds of number of winding wires are used in total, and the turn ratio suitable for a torque pulsation reduction is clarified. However, the number of turns needs to be integer.

Therefore, calculation of winding coefficients in the case of a change of the turn ratio in the winding wires shown in FIG. 1 to FIG. 3 explained in the first embodiment is performed. A calculation result of winding coefficients obtained when a turn ratio of the #1 winding wire and the #2 winding wire explained in the first embodiment is set to α (="a total number of turns of the first slot 23a"/"a total number of turns of the second slot 23b") is shown in FIG. 30.

Note that, in FIG. 30, a winding coefficient obtained in a winding method of the comparative example, that is, when the number of turns of the #1 winding wire and the number of turns of the #2 winding wire are the same (see FIG. 33 and FIG. 35) is set to 100. It is seen from FIG. 30 that the winding coefficient can be reduced to zero by setting α to $\sqrt{3}/2$.

When it is taken into account that the number of turns needs to be an integer, α only has to be set as an integer to be close to $\sqrt{3}/2$. Specifically, if α is set to 0.75 to 1.00, that is, $\sqrt{3}/2\pm15\%$, the winding coefficient is smaller than the winding coefficient of the comparative example. That is, if the ratio of the total number of turns in the first slot 23a and the total number of turns in the second slot 23b is $0.85\sqrt{3}:2$ to $1.15\sqrt{3}:2$, it is possible to set a harmonic winding coefficient smaller than the winding coefficient of the comparative example.

Further, if α is set to 0.8 to 0.93, that is, $\sqrt{3}/2\pm8\%$, the harmonic winding coefficient can be set to about a half or less of the winding coefficient of the comparative example. That is, if the ratio of the total number of turns in the first slot 23a and the total number of turns in the second slot 23b is $0.92\sqrt{3}:2$ to $1.08\sqrt{3}:2$, it is possible set the harmonic winding coefficient to about a half or less of the winding coefficient of the comparative example.

This idea can also be applicable in the case of the second to eighth embodiments. When an optimum turn ratio at which harmonic components of the winding coefficient are zero is α<1, if a turn ratio is set in a range of $\alpha^2$ to $\alpha(2-\alpha)$, it is possible to reduce the harmonic components of the winding coefficient to be smaller than the harmonic components in the comparative example. When the optimum turn ratio at which the harmonic components of the winding coefficient are zero is α>1, if the turn ratio is set in a range of 1 to $(2\alpha-1)$, it is possible to reduce the harmonic components of the winding coefficient to be smaller than the harmonic components in the comparative example.

As explained above, in the ninth embodiment, for example, the ratio of the total number of turns in the first slot 23a and the total number of turns in the second slot 23b is $0.85\sqrt{3}:2$ to $1.15\sqrt{3}:2$. Consequently, it is possible to set the harmonic winding coefficient smaller than the winding coefficient of the comparative example (see FIG. 33 and FIG. 35).

In the ninth embodiment, for example, the ratio of the total number of turns in the first slot 23a and the total number of turns in the second slot 23b is $0.92\sqrt{3}:2$ to $1.08\sqrt{3}:2$. Consequently, it is possible set the harmonic winding coefficient to about a half or less of the winding coefficient of the comparative example.

Note that, in the first to ninth embodiments, the number of turns is different between the first slot 23a in which the winding wires of the same phase are arranged and the second slot 23b in which the winding wires of different phases are arranged, and two kinds of the winding wires are used in total. Therefore, the sectional area of the winding wire can be changed according to a turn ratio.

For example, when a ratio of a total number of turns of the first slot 23a in which the winding wires of the same phase are arranged and a total number of turns of the second slot 23b in which the winding wires of different phases are arranged is represented as 1:K, the sectional area can be set to, for example, 1:1/K.

For example, the sectional areas of the winding wires of U1 (No. 1 lower), U2 (No. 2 upper), U3 (No. 2 lower), and U4 (No. 3 lower) in the first embodiment are represented as U1S, U2S, U3S, and U4S, a ratio of the sectional areas of the winding wires is as indicated by the following Formula (23).

$$U1S:U2S:U3S:U4S=1:2/\sqrt{3}:2/\sqrt{3}:1 \qquad (23)$$

By setting electric wire diameters for setting the sectional area of the winding wire as indicated by Formula (23), it is made possible to increase an occupancy ratio of the winding wire and reduce a copper loss.

It is also possible to increase an occupancy ratio of the winding wire and reduce a copper loss by, for example, arranging a plurality of winding wires having different winding diameters in one slot 23 and connecting the winding wires in series or changing the wire diameters of the winding wires halfway in winding work. The electric wire diameters, the winding diameters, and the wire diameters can be selected as appropriate such that the increase in the occupancy ratio can be attained taking into account productivity according to the number of turns and the wire diameter that depend on the capacity and the constitution of the rotary electric machine.

Alternatively, in the first to eighth embodiments, the permanent magnet-type rotary electric machine is explained. However, the same effects can be obtained by an induction motor and a reluctance motor that do not include a permanent magnet in a rotor. Further, the same effects can be obtained by a linear motor that performs linear driving.

In the present invention, a reduction in the specific winding coefficient harmonic components is attained by setting the number of turns different in the slot in which the winding wires of the same phase are arranged and the slot in which the winding wires of different phases are arranged. As explained in the third embodiment, a further torque pulsation reducing effect can be expected by concurrently using skew or the like.

INDUSTRIAL APPLICABILITY

As explained above, the rotary electric machine according to the present invention is useful for the operation of a mechanical apparatus.

REFERENCE SIGNS LIST 1, 1i, 1j, 1k, 1n, 1p, 1q, 1r, 901 Rotary electric machines
20, 20i, 20k, 20n, 20p, 20q, 20r Stators
21 Stator core
22 Teeth
23 Slots
23a First slots
23b Second slots
25 U-phase winding wires
26 V-phase winding wires
27 W-phase winding wires
30, 30j Rotors
31, 33j Rotor cores
32, 34j Permanent magnets
35j Upper stage
36j Lower stage

The invention claimed is:

1. A rotary electric machine comprising a stator of a distributed winding type including a plurality of first slots, in each of which winding wires of a plurality of same phases or a winding wire of one phase are arranged, and a plurality of second slots, in each of which winding wires of a plurality of different phases are arranged, wherein a total number of turns in each of the first slots is a same number, a total number of turns in each of the second slots is a same number, and when a number of poles is represented as P, a number of slots is represented as S, a number of phases of a power supply is represented as m, and a number of slots in each pole and each phase is represented as q=S/P/m, the number of slots q in each pole and each phase is 2i (i is an integer equal to or larger than 1), and i pieces of the first slot and i pieces of the second slot are alternately arranged, and a ratio of the total number of turns in each of the first slots and the total number of turns in each of the second slots is $0.85\sqrt{3}:2$ to $1.15\sqrt{3}:2$.

2. The rotary electric machine according to claim 1, wherein the ratio of the total number of turns in each of the first slots and the total number of turns in each of the second slots is $0.92\sqrt{3}:2$ to $1.08\sqrt{3}:2$.

* * * * *